United States Patent
Wu et al.

(10) Patent No.: US 10,236,949 B2
(45) Date of Patent: Mar. 19, 2019

(54) MULTIPLE-ANTENNA DATA TRANSMISSION METHOD, BASE STATION, USER EQUIPMENT, AND SYSTEM

(71) Applicant: HUAWEI TECHNOLOGIES CO., LTD., Shenzhen, Guangdong (CN)

(72) Inventors: Ye Wu, Shanghai (CN); Deli Qiao, Shenzhen (CN); Lei Wang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/891,658

(22) Filed: Feb. 8, 2018

(65) Prior Publication Data

US 2018/0234138 A1 Aug. 16, 2018

Related U.S. Application Data

(63) Continuation of application No. 15/337,834, filed on Oct. 28, 2016, now Pat. No. 9,923,614, which is a
(Continued)

(51) Int. Cl.
*H04B 7/04* (2017.01)
*H04B 7/0413* (2017.01)
(Continued)

(52) U.S. Cl.
CPC ......... *H04B 7/0413* (2013.01); *H04B 7/0452* (2013.01); *H04B 7/0456* (2013.01);
(Continued)

(58) Field of Classification Search
CPC .. H04B 7/0413; H04B 7/0452; H04B 7/0456; H04B 7/0478
See application file for complete search history.

(56) References Cited

U.S. PATENT DOCUMENTS

2010/0151871 A1  6/2010  Zhang et al.
2011/0075752 A1  3/2011  Zheng et al.
(Continued)

FOREIGN PATENT DOCUMENTS

CN  101442351 A   5/2009
CN  101931513 A  12/2010
(Continued)

OTHER PUBLICATIONS

Ansuman Adhikary et al.: "Joint Spatial Division and Multiplexingfor mm-Wave Channels", IEEE Journal on Selected Areas in Communications, vol. 32, No. 6, Jun. 2014. pp. 1239-1255, total 17 pages.
(Continued)

*Primary Examiner* — Jaison Joseph
(74) *Attorney, Agent, or Firm* — James Anderson Harrison

(57) ABSTRACT

Embodiments of the present invention disclose a base station, including: a first channel state information acquiring module, configured to acquire channel state information of dimension-reduced channel subspace by means of level-one channel state information measurement; a set determining module, configured to: schedule the user equipment, and determine a set of user equipment involved in multiple-input multiple-output; a second channel state information acquiring module, configured to: perform level-two channel state information measurement on user equipment in the set of user equipment to acquire state information of a dimension-reduced real-time channel; and a data sending module, configured to: process downlink data and a user-specific demodulation reference signal by means of two-level precoding, and send processed downlink data and a processed user-specific demodulation reference signal to the user equipment in the set of user equipment.

18 Claims, 20 Drawing Sheets

Related U.S. Application Data continuation of application No. PCT/CN2014/076370, filed on Apr. 28, 2014.

(51) Int. Cl.
*H04B 7/0456* (2017.01)
*H04B 7/06* (2006.01)
*H04L 5/00* (2006.01)
*H04B 7/0452* (2017.01)

(52) U.S. Cl.
CPC ......... *H04B 7/0478* (2013.01); *H04B 7/0626* (2013.01); *H04L 5/0051* (2013.01)

(56) References Cited

U.S. PATENT DOCUMENTS

| | | |
|---|---|---|
| 2012/0039412 A1 | 2/2012 | Geirhofer et al. |
| 2012/0120884 A1 | 5/2012 | Yu et al. |
| 2013/0215988 A1 | 8/2013 | Nagata et al. |
| 2013/0279457 A1 | 10/2013 | Takano |
| 2013/0287131 A1 | 10/2013 | Hart et al. |
| 2013/0322288 A1 | 12/2013 | Zhang et al. |
| 2015/0016379 A1 | 1/2015 | Nam et al. |
| 2016/0233937 A1* | 8/2016 | Li .................. H04B 7/0417 |
| 2016/0269084 A1* | 9/2016 | Nam .................. H04B 7/0417 |
| 2017/0047975 A1* | 2/2017 | Lee .................. H04B 7/0486 |

FOREIGN PATENT DOCUMENTS

| | | |
|---|---|---|
| CN | 101984571 A | 3/2011 |
| CN | 102130866 A | 7/2011 |
| CN | 102668401 A | 9/2012 |
| CN | 103119857 A | 5/2013 |
| CN | 103220069 A | 7/2013 |
| CN | 103607262 A | 2/2014 |
| EP | 2819313 A1 | 12/2014 |
| JP | 2010537595 A | 12/2010 |
| JP | 2012169774 A | 9/2012 |
| JP | 2013505672 A | 2/2013 |
| JP | 2013050567 A | 3/2013 |
| JP | 2014506086 A | 3/2014 |
| RU | 2014105 C1 | 6/1994 |
| WO | 2010032385 A1 | 3/2010 |
| WO | 2011037745 A2 | 3/2011 |
| WO | 2011162422 A1 | 12/2011 |
| WO | 2013125917 A1 | 8/2013 |
| WO | 2014027824 A1 | 2/2014 |

OTHER PUBLICATIONS

Adhikary Ansuman et al: "Joint spatial division and multiplexing-the large-scale array Regime", IEEE transaction on information theory, vol. 59, No. 10, Oct. 2013, XP11526827, total 23 pages.

* cited by examiner

MULTIPLE-ANTENNA DATA TRANSMISSION METHOD, BASE STATION, USER EQUIPMENT, AND SYSTEM

CROSS-REFERENCE TO RELATED APPLICATIONS

This application is a continuation of U.S. patent application Ser. No. 15/337,834, filed on Oct. 28, 2016, which is Continuation of an International Patent Application No. PCT/CN2014/076370, filed on Apr. 28, 2014. All of the aforementioned patent applications are hereby incorporated by reference in their entireties.

TECHNICAL FIELD

The present invention relates to the communications field, and in particular, to a multiple-antenna data transmission method, a base station, user equipment, and a system.

BACKGROUND

In 3GPP Long Term Evolution/3GPP Long Term Evolution Advanced (Long term evolution/Long term evolution-advanced, LTE/LTE-A), with a continuous and rapid increase in a quantity of antennas at a data transmit end, a quantity of user equipment (User equipment, UE) that needs to be served, that is, a quantity of to-be-scheduled UE, also rapidly increases. The increase in the quantity of antennas may provide space freedom of a higher degree, which creates a favorable condition for multiplexing multiple data flows in downlink space (which may be (Single-user Multiple-input Multiple-output, SU-MIMO) or (Multi-user Multiple-input Multiple-output, MU-MIMO)).

To acquire space freedom of a high degree that can be provided by massive antennas, related channel state information (CSI) must be acquired by the data transmit end (which is generally a base station), so as to acquire precise precoding (precoder). When MIMO is being performed, in the prior art (for example, LTE/LTE-A), the data transmit end generally acquires the CSI by using two methods:

In one method, in a case of time division duplexing (Time division duplexing, TDD)/frequency division duplexing (Frequency division duplexing, FDD), the data transmit end sends a pilot for CSI downlink measurement, a data receive end (which is generally UE) measures the pilot to acquire CSI, the UE then feeds back the CSI (which is generally quantized CSI and is PMI+RI in LTE), and the data transmit end performs precoding on data by using the CSI and sends precoded data. In the other method, in a case of TDD, a data receive end sends a pilot (for example, an SRS in LTE/LTE-A) for CSI uplink measurement, the data transmit end performs uplink channel CSI measurement, the data transmit end considers that the uplink channel measurement is a downlink channel according to channel reciprocity (a necessary reciprocity parameter is generally required for modification), and then performs precoding on data according to the CSI and sends precoded data.

A volume of downlink pilot overheads is proportional to a quantity of antennas at a data transmit end, a volume of uplink pilot overheads is also proportional to a quantity of to-be-served UE, and a quantity of uplink CSI feedbacks is also proportional to the quantity of antennas at the data transmit end. Therefore, when the quantity of antennas at the data transmit end is not very large (for example, 4/8 antennas in LTE/LTE-A), pilot overheads and a quantity of uplink CSI feedbacks can be controlled; however, when the quantity of antennas is relatively large (a quantity of UE that can be scheduled also increases), uplink and downlink pilot overheads and a quantity of uplink CSI feedbacks occupy a large quantity of time-frequency resources, which results in reduced compresses time-frequency resources available for data transmission, thereby greatly affecting a system throughput.

SUMMARY

A technical problem to be resolved by embodiments of the present invention is to provide a multiple-antenna data transmission method, a base station, user equipment, and a system, to resolve a technical problem in the prior art that uplink and downlink pilot overheads are large and a quantity of uplink CSI feedbacks is large when a quantity of antennas at a data transmit end is relatively large (a quantity of to-be-served UE is also relatively large), thereby increasing a system throughput.

According to a first aspect, a base station is provided, including:

a first channel state information acquiring module, configured to acquire channel state information of dimension-reduced channel subspace by means of level-one channel state information measurement, where the channel subspace is channel subspace obtained after dimension reduction is performed on statistical channel subspace of each to-be-scheduled user equipment;

a set determining module, configured to: schedule the user equipment, and determine a set of user equipment involved in multiple-input multiple-output;

a second channel state information acquiring module, configured to perform level-two channel state information measurement on user equipment in the set of user equipment to acquire state information of a dimension-reduced real-time channel; and a data sending module, configured to: process downlink data and a user-specific demodulation reference signal by means of two-level precoding, and send processed downlink data and a processed user-specific demodulation reference signal to the user equipment in the set of user equipment, where the two-level precoding includes first-level precoding corresponding to the channel state information of the channel subspace and second-level precoding corresponding to the state information of the real-time channel.

With reference to the first aspect, in a first possible implementation manner, the first channel state information acquiring module includes:

a level-one RS sending unit, configured to send a cell-specific level-one reference signal RS to the user equipment; and a first channel state receiving unit, configured to receive the channel state information, fed back by the to-be-scheduled user equipment, of the dimension-reduced channel subspace, where the channel state information of the channel subspace is channel state information, obtained after the to-be-scheduled user equipment performs measurement according to the cell-specific level-one RS to obtain corresponding channel subspace and performs dimension reduction and quantization on the channel subspace, of the channel subspace.

With reference to the first aspect, in a second possible implementation manner, the first channel state information acquiring module includes:

a level-one RS receiving unit, configured to receive a user-specific level-one RS sent by the to-be-scheduled user equipment; and a level-one RS measurement unit, configured to: measure the user-specific level-one RS to obtain channel subspace corresponding to the to-be-scheduled user equipment, and perform dimension reduction on the channel subspace to obtain the channel state information of the dimension-reduced channel subspace.

With reference to the first aspect, in a third possible implementation manner, the second channel state information acquiring module includes:

a level-two RS sending unit, configured to send a user-specific level-two RS to the user equipment in the set of user equipment; and a second channel state receiving unit, configured to receive the state information, fed back by the user equipment in the set of user equipment, of the dimension-reduced real-time channel, where the state information of the dimension-reduced real-time channel is state information, obtained after the user equipment in the set of user equipment performs measurement and quantization on the dimension-reduced real-time channel according to the user-specific level-two RS, of the dimension-reduced real-time channel.

With reference to the first aspect, in a fourth possible implementation manner, the second channel state information acquiring module includes:

a signaling notification sending unit, configured to send a signaling notification to the user equipment in the set of user equipment, where the signaling notification is used to instruct the user equipment in the set of user equipment to send a user-specific level-two RS to the base station;

a level-two RS receiving unit, configured to receive the user-specific level-two RS sent by the user equipment in the set of user equipment; and a level-two RS measurement unit, configured to measure the dimension-reduced real-time channel according to the user-specific level-two RS to obtain the state information of the dimension-reduced real-time channel.

With reference to the third possible implementation manner of the first aspect or the fourth possible implementation manner of the first aspect, in a fifth possible implementation manner, the user-specific level-two RS is a user-specific level-two RS which has been processed by means of the first-level precoding corresponding to the channel state information of the channel subspace.

With reference to the first aspect, or the first possible implementation manner of the first aspect, or the second possible implementation manner of the first aspect, or the third possible implementation manner of the first aspect, or the fourth possible implementation manner of the first aspect, or the fifth possible implementation manner of the first aspect, in a sixth possible implementation manner, the data sending module includes:

a first processing and sending unit, configured to: multiply the downlink data by the second-level precoding corresponding to the state information of the real-time channel and then by the first-level precoding corresponding to the channel state information of the channel subspace, and send a result of the multiplying to the user equipment in the set of user equipment; and a second processing and sending unit, configured to: multiply the user-specific demodulation reference signal by the second-level precoding corresponding to the state information of the real-time channel and then by the first-level precoding corresponding to the channel state information of the channel subspace, and send a result of the multiplying to the user equipment in the set of user equipment.

According to a second aspect, user equipment is provided, where the user equipment is to-be-scheduled user equipment and includes:

a first measurement cooperation module, configured to cooperate with a base station to complete level-one channel state information measurement, so that the base station acquires channel state information of dimension-reduced channel subspace, where the channel subspace is channel subspace obtained after dimension reduction is performed on statistical channel subspace of each to-be-scheduled user equipment;

a second measurement cooperation module, configured to: when the user equipment is user equipment involved in multiple-input multiple-output, cooperate with the base station to complete level-two channel state information measurement, so that the base station acquires state information of a dimension-reduced real-time channel; and a data receiving module, configured to receive downlink data and a user-specific demodulation reference signal that are sent by the base station, where the downlink data and the user-specific demodulation reference signal are data sent by the base station after being processed by means of two-level precoding, and the two-level precoding includes first-level precoding corresponding to the channel state information of the channel subspace and second-level precoding corresponding to the state information of the real-time channel.

With reference to the second aspect, in a first possible implementation manner, the first measurement cooperation module includes:

a level-one RS receiving unit, configured to receive a cell-specific level-one reference signal RS sent by the base station;

a level-one RS measurement unit, configured to: perform measurement according to the cell-specific level-one RS to obtain corresponding channel subspace, and perform dimension reduction and quantization on the channel subspace to obtain the channel state information of the dimension-reduced channel subspace; and a first feedback unit, configured to feed the channel state information of the dimension-reduced channel subspace back to the base station.

With reference to the second aspect, in a second possible implementation manner, the first measurement cooperation module includes:

a level-one RS sending unit, configured to send a user-specific level-one RS to the base station, where the user-specific level-one RS is a level-one RS used by the base station to perform measurement to obtain the channel state information of the dimension-reduced channel subspace.

With reference to the second aspect, in a third possible implementation manner, the second measurement cooperation module includes:

a level-two RS receiving unit, configured to: when the user equipment is user equipment involved in multiple-input multiple-output, receive a user-specific level-two RS sent by the base station;

a level-two RS measurement unit, configured to perform measurement and quantization on the dimension-reduced real-time channel according to the user-specific level-two RS to obtain the state information of the dimension-reduced real-time channel; and a second feedback unit, configured to feed the state information of the dimension-reduced real-time channel back to the base station.

With reference to the second aspect, in a fourth possible implementation manner, the second measurement cooperation module includes:

a signaling notification receiving unit, configured to: when the user equipment is user equipment involved in multiple-input multiple-output, receive a signaling notification sent by the base station, where the signaling notification is used to instruct the user equipment to send a user-specific level-two RS to the base station; and a level-two RS sending unit, configured to send the user-specific level-two RS to the base station, where the user-specific level-two RS is a level-two RS used by the base station to perform measurement to obtain the state information of the dimension-reduced real-time channel.

With reference to the third possible implementation manner of the second aspect or the fourth possible implementation manner of the second aspect, in a fifth possible implementation manner, the user-specific level-two RS is a user-specific level-two RS which has been processed by means of the first-level precoding corresponding to the channel state information of the channel subspace.

With reference to the second aspect, or the first possible implementation manner of the second aspect, or the second possible implementation manner of the second aspect, or the third possible implementation manner of the second aspect, or the fourth possible implementation manner of the second aspect, or the fifth possible implementation manner of the second aspect, in a sixth possible implementation manner, the user equipment further includes:

a demodulation module, configured to: after the data receiving module receives the downlink data and the user-specific demodulation reference signal that are sent by the base station, demodulate the user-specific demodulation reference signal, estimate a data channel, and demodulate the downlink data.

According to a third aspect, a multiple-antenna data transmission system is provided, including a base station and user equipment, where the base station is the base station with reference to the first aspect, or the first possible implementation manner of the first aspect, or the second possible implementation manner of the first aspect, or the third possible implementation manner of the first aspect, or the fourth possible implementation manner of the first aspect, or the fifth possible implementation manner of the first aspect, or the sixth possible implementation manner of the first aspect; and the user equipment is the user equipment with reference to the second aspect, or the first possible implementation manner of the second aspect, or the second possible implementation manner of the second aspect, or the third possible implementation manner of the second aspect, or the fourth possible implementation manner of the second aspect, or the fifth possible implementation manner of the second aspect, or the sixth possible implementation manner of the second aspect.

According to a fourth aspect, a multiple-antenna data transmission method is provided, including:

acquiring, by a base station, channel state information of dimension-reduced channel subspace by means of level-one channel state information measurement, where the channel subspace is channel subspace obtained after dimension reduction is performed on statistical channel subspace of each to-be-scheduled user equipment;

scheduling, by the base station, the user equipment, determining a set of user equipment involved in multiple-input multiple-output, and performing level-two channel state information measurement on user equipment in the set of user equipment to acquire state information of a dimension-reduced real-time channel; and processing, by the base station, downlink data and a user-specific demodulation reference signal by means of two-level precoding, and sending processed downlink data and a processed user-specific demodulation reference signal to the user equipment in the set of user equipment, where the two-level precoding includes first-level precoding corresponding to the channel state information of the channel subspace and second-level precoding corresponding to the state information of the real-time channel.

With reference to the fourth aspect, in a first possible implementation manner, the acquiring, by a base station, channel state information of dimension-reduced channel subspace by means of level-one channel state information measurement includes:

sending, by the base station, a cell-specific level-one reference signal RS to the user equipment; and receiving, by the base station, the channel state information, fed back by the to-be-scheduled user equipment, of the dimension-reduced channel subspace, where the channel state information of the channel subspace is channel state information, obtained after the to-be-scheduled user equipment performs measurement according to the cell-specific level-one RS to obtain corresponding channel subspace and performs dimension reduction and quantization on the channel subspace, of the channel subspace.

With reference to the fourth aspect, in a second possible implementation manner, the acquiring, by a base station, channel state information of dimension-reduced channel subspace by means of level-one channel state information measurement includes:

receiving, by the base station, a user-specific level-one RS sent by the to-be-scheduled user equipment; and measuring, by the base station, the user-specific level-one RS to obtain channel subspace corresponding to the to-be-scheduled user equipment, and performing dimension reduction on the channel subspace to obtain the channel state information of the dimension-reduced channel subspace.

With reference to the fourth aspect, in a third possible implementation manner, the performing level-two channel state information measurement on user equipment in the set of user equipment to acquire state information of a dimension-reduced real-time channel includes:

sending, by the base station, a user-specific level-two RS to the user equipment in the set of user equipment; and receiving, by the base station, the state information, fed back by the user equipment in the set of user equipment, of the dimension-reduced real-time channel, where the state information of the dimension-reduced real-time channel is state information, obtained after the user equipment in the set of user equipment performs measurement and quantization on the dimension-reduced real-time channel according to the user-specific level-two RS, of the dimension-reduced real-time channel.

With reference to the fourth aspect, in a fourth possible implementation manner, the performing level-two channel state information measurement on user equipment in the set of user equipment to acquire state information of a dimension-reduced real-time channel includes:

sending, by the base station, a signaling notification to the user equipment in the set of user equipment, where the signaling notification is used to instruct the user equipment in the set of user equipment to send a user-specific level-two RS to the base station;

receiving, by the base station, the user-specific level-two RS sent by the user equipment in the set of user equipment; and measuring the dimension-reduced real-time channel according to the user-specific level-two RS to obtain the state information of the dimension-reduced real-time channel.

With reference to the third possible implementation manner of the fourth aspect or the fourth possible implementation manner of the fourth aspect, in a fifth possible implementation manner, the user-specific level-two RS is a user-specific level-two RS which has been processed by means of the first-level precoding corresponding to the channel state information of the channel subspace.

With reference to the fourth aspect, or the first possible implementation manner of the fourth aspect, or the second possible implementation manner of the fourth aspect, or the third possible implementation manner of the fourth aspect, or the fourth possible implementation manner of the fourth aspect, or the fifth possible implementation manner of the fourth aspect, in a sixth possible implementation manner, the processing, by the base station, downlink data and a user-specific demodulation reference signal by means of two-level precoding, and sending processed downlink data and a processed user-specific demodulation reference signal to the user equipment in the set of user equipment includes:

multiplying, by the base station, the downlink data by the second-level precoding corresponding to the state information of the real-time channel and then by the first-level precoding corresponding to the channel state information of the channel subspace, and sending a result of the multiplying to the user equipment in the set of user equipment; and multiplying, by the base station, the user-specific demodulation reference signal by the second-level precoding corresponding to the state information of the real-time channel and then by the first-level precoding corresponding to the channel state information of the channel subspace, and sending a result of the multiplying to the user equipment in the set of user equipment.

According to a fifth aspect, a multiple-antenna data transmission method is provided, including:

cooperating, by to-be-scheduled user equipment, with a base station to complete level-one channel state information measurement, so that the base station acquires channel state information of dimension-reduced channel subspace, where the channel subspace is channel subspace obtained after dimension reduction is performed on statistical channel subspace of each to-be-scheduled user equipment;

cooperating, by user equipment involved in multiple-input multiple-output, with the base station to complete level-two channel state information measurement, so that the base station acquires state information of a dimension-reduced real-time channel; and receiving, by the user equipment involved in multiple-input multiple-output, downlink data and a user-specific demodulation reference signal that are sent by the base station, where the downlink data and the user-specific demodulation reference signal are data sent by the base station after being processed by means of two-level precoding, and the two-level precoding includes first-level precoding corresponding to the channel state information of the channel subspace and second-level precoding corresponding to the state information of the real-time channel.

With reference to the fifth aspect, in a first possible implementation manner, the cooperating, by to-be-scheduled user equipment, with a base station to complete level-one channel state information measurement, so that the base station acquires channel state information of dimension-reduced channel subspace includes:

receiving, by the to-be-scheduled user equipment, a cell-specific level-one reference signal RS sent by the base station;

performing measurement according to the cell-specific level-one RS to obtain corresponding channel subspace, and performing dimension reduction and quantization on the channel subspace to obtain the channel state information of the dimension-reduced channel subspace; and feeding the channel state information of the dimension-reduced channel subspace back to the base station.

With reference to the fifth aspect, in a second possible implementation manner, the cooperating, by to-be-scheduled user equipment, with a base station to complete level-one channel state information measurement, so that the base station acquires channel state information of dimension-reduced channel subspace includes:

sending, by the to-be-scheduled user equipment, a user-specific level-one RS to the base station, where the user-specific level-one RS is a level-one RS used by the base station to perform measurement to obtain the channel state information of the dimension-reduced channel subspace.

With reference to the fifth aspect, in a third possible implementation manner, the cooperating, by user equipment involved in multiple-input multiple-output, with the base station to complete level-one channel state information measurement, so that the base station acquires state information of a dimension-reduced real-time channel includes:

receiving, by the user equipment involved in multiple-input multiple-output, a user-specific level-two RS sent by the base station;

performing measurement and quantization on the dimension-reduced real-time channel according to the user-specific level-two RS to obtain the state information of the dimension-reduced real-time channel; and feeding the state information of the dimension-reduced real-time channel back to the base station.

With reference to the fifth aspect, in a fourth possible implementation manner, the cooperating, by user equipment involved in multiple-input multiple-output, with the base station to complete level-two channel state information measurement, so that the base station acquires state information of a dimension-reduced real-time channel includes:

receiving, by the user equipment involved in multiple-input multiple-output, a signaling notification sent by the base station, where the signaling notification is used to instruct the user equipment to send a user-specific level-two RS to the base station; and sending the user-specific level-two RS to the base station, where the user-specific level-two RS is a level-two RS used by the base station to perform measurement to obtain the state information of the dimension-reduced real-time channel.

With reference to the third possible implementation manner of the fifth aspect or the fourth possible implementation manner of the fifth aspect, in a fifth possible implementation manner, the user-specific level-two RS is a user-specific level-two RS which has been processed by means of the first-level precoding corresponding to the channel state information of the channel subspace.

With reference to the fifth aspect, or the first possible implementation manner of the fifth aspect, or the second possible implementation manner of the fifth aspect, or the third possible implementation manner of the fifth aspect, or the fourth possible implementation manner of the fifth aspect, or the fifth possible implementation manner of the fifth aspect, in a sixth possible implementation manner, after the receiving, by the user equipment involved in multiple-input multiple-output, downlink data and a user-specific demodulation reference signal that are sent by the base station, the method further includes:

demodulating the user-specific demodulation reference signal, estimating a data channel, and demodulating the downlink data.

According to a sixth aspect, a base station is provided, including an input apparatus, an output apparatus, a memory, and a processor, where the memory is configured to store program code, and the processor is configured to invoke the program code stored in the memory, to execute the following steps:

acquiring channel state information of dimension-reduced channel subspace by means of level-one channel state information measurement, where the channel subspace is channel subspace obtained after dimension reduction is performed on statistical channel subspace of each to-be-scheduled user equipment; scheduling the user equipment, determining a set of user equipment involved in multiple-input multiple-output, and performing level-two channel state information measurement on user equipment in the set of user equipment to acquire state information of a dimension-reduced real-time channel; and processing downlink data and a user-specific demodulation reference signal by means of two-level precoding, and sending processed downlink data and a processed user-specific demodulation reference signal to the user equipment in the set of user equipment by using the output apparatus, where the two-level precoding includes first-level precoding corresponding to the channel state information of the channel subspace and second-level precoding corresponding to the state information of the real-time channel.

With reference to the sixth aspect, in a first possible implementation manner, that the processor acquires channel state information of dimension-reduced channel subspace by means of level-one channel state information measurement includes:

sending a cell-specific level-one reference signal RS to the user equipment by using the output apparatus; and receiving, by using the input apparatus, the channel state information, fed back by the to-be-scheduled user equipment, of the dimension-reduced channel subspace, where the channel state information of the channel subspace is channel state information, obtained after the to-be-scheduled user equipment performs measurement according to the cell-specific level-one RS to obtain corresponding channel subspace and performs dimension reduction and quantization on the channel subspace, of the channel subspace.

With reference to the sixth aspect, in a second possible implementation manner, that the processor acquires channel state information of dimension-reduced channel subspace by means of level-one channel state information measurement includes:

receiving, by using the input apparatus, a user-specific level-one RS sent by the to-be-scheduled user equipment; and measuring the user-specific level-one RS to obtain channel subspace corresponding to the to-be-scheduled user equipment, and performing dimension reduction on the channel subspace to obtain the channel state information of the dimension-reduced channel subspace.

With reference to the sixth aspect, in a third possible implementation manner, that the processor performs level-two channel state information measurement on user equipment in the set of user equipment to acquire state information of a dimension-reduced real-time channel includes:

sending, by using the output apparatus, a user-specific level-two RS to the user equipment in the set of user equipment; and receiving, by using the input apparatus, the state information, fed back by the user equipment in the set of user equipment, of the dimension-reduced real-time channel, where the state information of the dimension-reduced real-time channel is state information, obtained after the user equipment in the set of user equipment performs measurement and quantization on the dimension-reduced real-time channel according to the user-specific level-two RS, of the dimension-reduced real-time channel.

With reference to the sixth aspect, in a fourth possible implementation manner, that the processor performs level-two channel state information measurement on user equipment in the set of user equipment to acquire state information of a dimension-reduced real-time channel includes:

sending, by using the output apparatus, a signaling notification to the user equipment in the set of user equipment, where the signaling notification is used to instruct the user equipment in the set of user equipment to send a user-specific level-two RS to the base station; receiving, by using the input apparatus, the user-specific level-two RS sent by the user equipment in the set of user equipment; and measuring the dimension-reduced real-time channel according to the user-specific level-two RS to obtain the state information of the dimension-reduced real-time channel.

With reference to the third possible implementation manner of the sixth aspect or the fourth possible implementation manner of the sixth aspect, in a fifth possible implementation manner, the user-specific level-two RS is a user-specific level-two RS which has been processed by means of the first-level precoding corresponding to the channel state information of the channel subspace.

With reference to the sixth aspect, or the first possible implementation manner of the sixth aspect, or the second possible implementation manner of the sixth aspect, or the third possible implementation manner of the sixth aspect, or the fourth possible implementation manner of the sixth aspect, or the fifth possible implementation manner of the sixth aspect, in a sixth possible implementation manner, that the processor processes downlink data and a user-specific demodulation reference signal by means of two-level precoding, and sends processed downlink data and a processed user-specific demodulation reference signal to the user equipment in the set of user equipment includes:

multiplying the downlink data by the second-level precoding corresponding to the state information of the real-time channel and then by the first-level precoding corresponding to the channel state information of the channel subspace, and sending a result of the multiplying to the user equipment in the set of user equipment by using the output apparatus; and multiplying the user-specific demodulation reference signal by the second-level precoding corresponding to the state information of the real-time channel and then by the first-level precoding corresponding to the channel state information of the channel subspace, and sending a result of the multiplying to the user equipment in the set of user equipment by using the output apparatus.

According to a seventh aspect, user equipment is provided, where the user equipment is to-be-scheduled user equipment and includes: an input apparatus, an output apparatus, a memory, and a processor, where the memory is configured to store program code, and the processor is configured to invoke the program code stored in the memory, to execute the following steps:

cooperating with a base station to complete level-one channel state information measurement, so that the base station acquires channel state information of dimension-reduced channel subspace, where the channel subspace is channel subspace obtained after dimension reduction is performed on statistical channel subspace of each to-be-scheduled user equipment; when the user equipment is user equipment involved in multiple-input multiple-output, cooperating with the base station to complete level-two channel state information measurement, so that the base station acquires state information of a dimension-reduced real-time channel; and receiving, by using the input apparatus, downlink data and a user-specific demodulation reference signal that are sent by the base station, where the downlink data and the user-specific demodulation reference signal are data sent by the base station after being processed by means of two-level precoding, and the two-level precoding includes first-level precoding corresponding to the channel state information of the channel subspace and second-level precoding corresponding to the state information of the real-time channel.

With reference to the seventh aspect, in a first possible implementation manner, that the processor cooperates with a base station to complete level-one channel state information measurement, so that the base station acquires channel state information of dimension-reduced channel subspace includes:

receiving, by using the input apparatus, a cell-specific level-one reference signal RS sent by the base station; performing measurement according to the cell-specific level-one RS to obtain corresponding channel subspace, and performing dimension reduction and quantization on the channel subspace to obtain the channel state information of the dimension-reduced channel subspace; and feeding the channel state information of the dimension-reduced channel subspace back to the base station by using the output apparatus.

With reference to the seventh aspect, in a second possible implementation manner, that the processor cooperates with a base station to complete level-one channel state information measurement, so that the base station acquires channel state information of dimension-reduced channel subspace includes:

sending, by using the output apparatus, a user-specific level-one RS to the base station, where the user-specific level-one RS is a level-one RS used by the base station to perform measurement to obtain the channel state information of the dimension-reduced channel subspace.

With reference to the seventh aspect, in a third possible implementation manner, that the processor cooperates with the base station to complete level-two channel state information measurement, so that the base station acquires state information of a dimension-reduced real-time channel includes:

receiving, by using the input apparatus, a user-specific level-two RS sent by the base station; performing measurement and quantization on the dimension-reduced real-time channel according to the user-specific level-two RS to obtain the state information of the dimension-reduced real-time channel; and feeding the state information of the dimension-reduced real-time channel back to the base station by using the output apparatus.

With reference to the seventh aspect, in a fourth possible implementation manner, that the processor cooperates with the base station to complete level-two channel state information measurement, so that the base station acquires state information of a dimension-reduced real-time channel includes:

receiving, by using the input apparatus, a signaling notification sent by the base station, where the signaling notification is used to instruct the user equipment to send a user-specific level-two RS to the base station; and sending the user-specific level-two RS to the base station by using the output apparatus, where the user-specific level-two RS is a level-two RS used by the base station to perform measurement to obtain the state information of the dimension-reduced real-time channel.

With reference to the third possible implementation manner of the seventh aspect or the fourth possible implementation manner of the seventh aspect, in a fifth possible implementation manner, the user-specific level-two RS is a user-specific level-two RS which has been processed by means of the first-level precoding corresponding to the channel state information of the channel subspace.

With reference to the seventh aspect, or the first possible implementation manner of the seventh aspect, or the second possible implementation manner of the seventh aspect, or the third possible implementation manner of the seventh aspect, or the fourth possible implementation manner of the seventh aspect, or the fifth possible implementation manner of the seventh aspect, in a sixth possible implementation manner, after receiving downlink data and a user-specific demodulation reference signal that are sent by the base station, the processor further executes:

demodulating the user-specific demodulation reference signal, estimating a data channel, and demodulating the downlink data.

According to an eighth aspect, a network system is provided, including a base station and user equipment, where the base station is the base station with reference to the sixth aspect, or the first possible implementation manner of the sixth aspect, or the second possible implementation manner of the sixth aspect, or the third possible implementation manner of the sixth aspect, or the fourth possible implementation manner of the sixth aspect, or the fifth possible implementation manner of the sixth aspect, or the sixth possible implementation manner of the sixth aspect; and the user equipment is the user equipment with reference to the seventh aspect, or the first possible implementation manner of the seventh aspect, or the second possible implementation manner of the seventh aspect, or the third possible implementation manner of the seventh aspect, or the fourth possible implementation manner of the seventh aspect, or the fifth possible implementation manner of the seventh aspect, or the sixth possible implementation manner of the seventh aspect.

By implementing the embodiments of the present invention, channel state information of dimension-reduced channel subspace is acquired by means of level-one channel state information measurement, level-two channel state information measurement is performed on user equipment in a set of user equipment to acquire state information of a dimension-reduced real-time channel, downlink data and a user-specific demodulation reference signal are processed by means of two-level precoding, and processed downlink data and a processed user-specific demodulation reference signal are sent, which resolves a technical problem in the prior art that uplink and downlink pilot overheads are large and a quantity of uplink CSI feedbacks is large when a quantity of antennas at a data transmit end is relatively large (a quantity of to-be-served UE is also relatively large), so that more time-frequency resources in a system are available for data transmission, thereby effectively increasing a system throughout; in addition, by means of channel dimension reduction, a problem of high complexity in baseband processing in a system in the prior art can be resolved, thereby reducing requirements on a baseband processing capability.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 1:
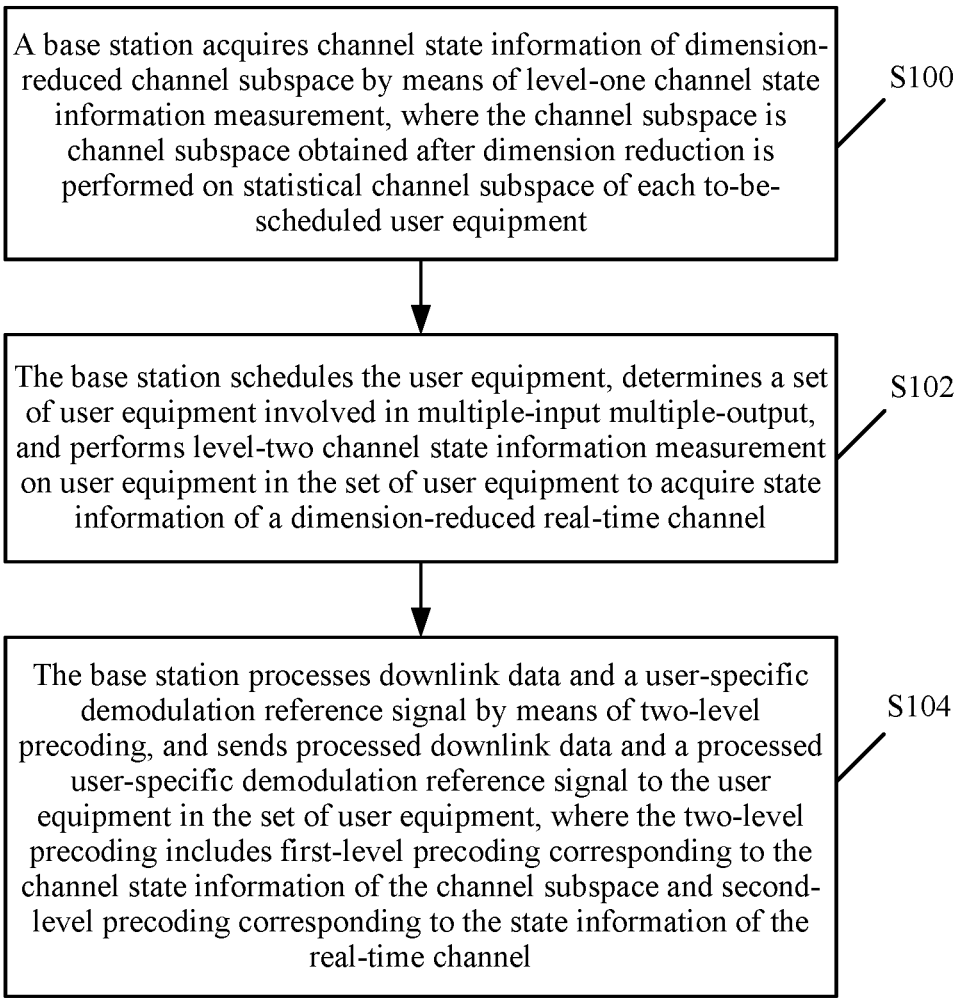
FIG. 1 is a schematic flowchart of a multiple-antenna data transmission method according to an embodiment of the present invention.

Referring to FIG. 1, FIG. 1 is a schematic flowchart of a multiple-antenna data transmission method according to an embodiment of the present invention. Described from a perspective of a data transmit end (that is, a network base station side), the method includes:

Step S100: A base station acquires channel state information of dimension-reduced channel subspace by means of level-one channel state information measurement, where the channel subspace is channel subspace obtained after dimension reduction is performed on statistical channel subspace of each to-be-scheduled user equipment.

Step S102: The base station schedules the user equipment, determines a set of user equipment involved in multiple-input multiple-output, and performs level-two channel state information measurement on user equipment in the set of user equipment to acquire state information of a dimension-reduced real-time channel.

Step S104: The base station processes downlink data and a user-specific demodulation reference signal by means of two-level precoding, and sends processed downlink data and a processed user-specific demodulation reference signal to the user equipment in the set of user equipment, where the two-level precoding includes first-level precoding corresponding to the channel state information of the channel subspace and second-level precoding corresponding to the state information of the real-time channel.

Specifically, in a process of step S100 in which the base station acquires the channel state information of the dimension-reduced channel subspace by means of level-one channel state information measurement, time-frequency density is low; in a process of step S102 in which the base station acquires the state information of the dimension-reduced real-time channel, although time-frequency density is high, measurement is performed only on the user equipment in the set of user equipment involved in multiple-input multiple-output, and a quantity of UE is limited; therefore, sending is performed after data processing is performed by means of the two-level precoding with reference to step S104, which resolves a technical problem in the prior art that uplink and downlink pilot overheads are large and a quantity of uplink CSI feedbacks is large when a quantity of antennas at the data transmit end is relatively large (a quantity of to-be-served UE is also relatively large), so that more time-frequency resources in a system are available for data transmission, thereby effectively increasing a system throughout.

Further, with reference to FIG. 2 to FIG. 5, from a perspective of both a data transmit end and a data receive end, the following uses four embodiments to describe in detail the technical solution of a multiple-antenna data transmission method in the present invention.

Figure 2:
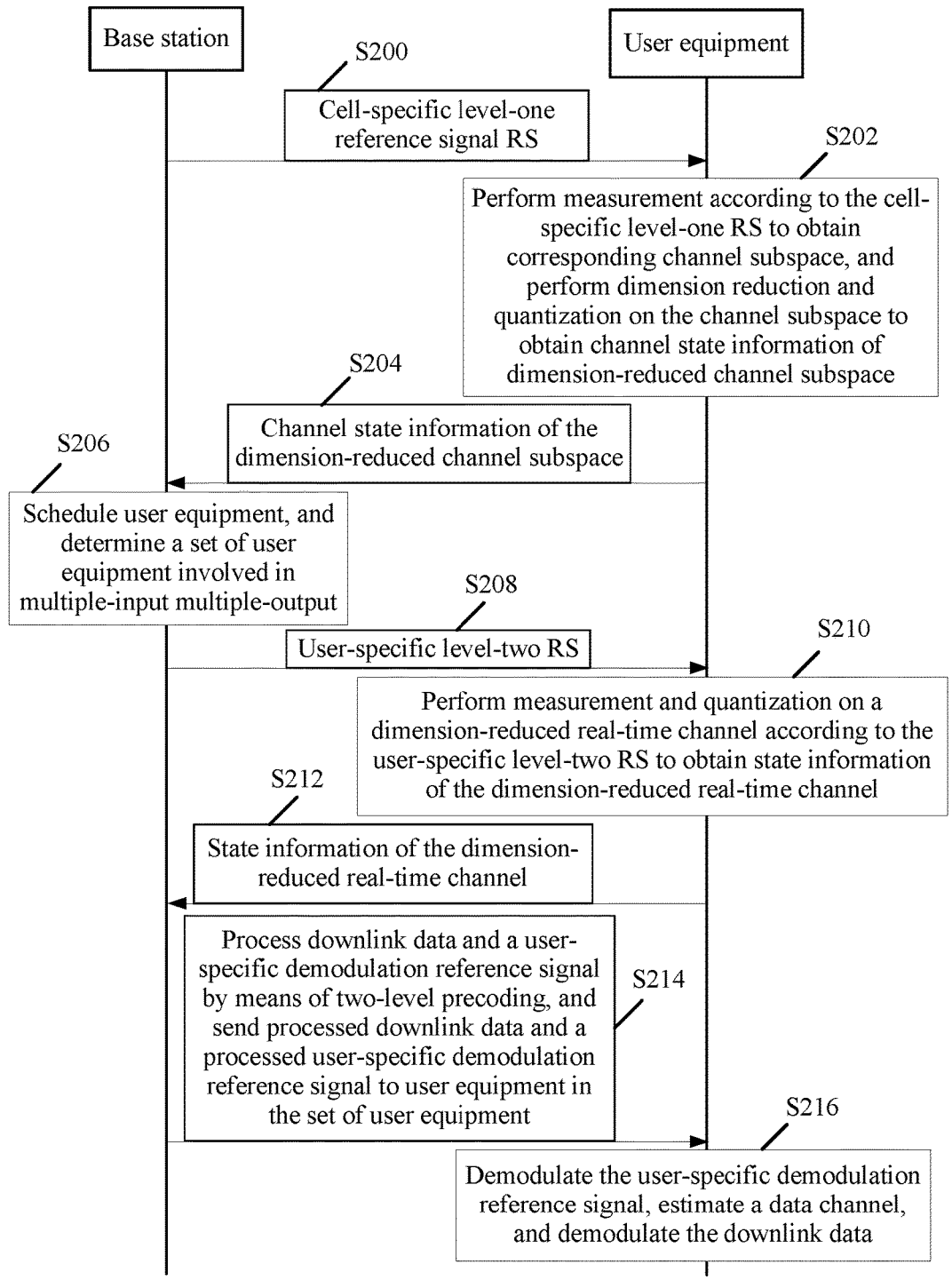
FIG. 2 is a schematic flowchart of another embodiment of a multiple-antenna data transmission method according to the present invention.

As shown in FIG. 2, FIG. 2 is a schematic flowchart of another embodiment of a multiple-antenna data transmission method according to the present invention. A TDD scenario and an FDD scenario are used in this embodiment, and the method includes:

Step S200: A base station sends a cell-specific level-one reference signal RS to user equipment.

Specifically, because the cell-specific level-one reference signal RS is sent, time-frequency density in executing step S200 is very low.

Step S202: After receiving the cell-specific level-one RS sent by the base station, to-be-scheduled user equipment performs measurement according to the cell-specific level-one RS to obtain corresponding channel subspace, and performs dimension reduction and quantization on the channel subspace to obtain channel state information of dimension-reduced channel subspace.

Specifically, the to-be-scheduled user equipment and the base station first reach an agreement and completes negotiation between the two parties, and after receiving the cell-specific level-one RS sent by the base station, the to-be-scheduled user equipment executes measurement of the cell-specific level-one RS.

Step S204: Feed the channel state information of the dimension-reduced channel subspace back to the base station.

Specifically, time-frequency density in executing step S204 is also very low.

Step S206: The base station schedules the user equipment, and determines a set of user equipment involved in multiple-input multiple-output.

Specifically, involving in multiple-input multiple-output may include involving in SU-MIMO or MU-MIMO.

Step S208: The base station sends a user-specific level-two RS to user equipment in the set of user equipment.

Specifically, the base station sends the user-specific UE-specific level-two RS to the user equipment in the set of user equipment by using a dimension-reduced channel. Although time-frequency density in executing step S208 is high, the user-specific level-two RS is sent only to the user equipment in the set of user equipment, and therefore, system overheads are under control.

Step S210: After receiving the user-specific level-two RS sent by the base station, the user equipment involved in multiple-input multiple-output performs measurement and quantization on a dimension-reduced real-time channel according to the user-specific level-two RS to obtain state information of the dimension-reduced real-time channel.

Step S212: Feed the state information of the dimension-reduced real-time channel back to the base station.

Specifically, although time-frequency density in executing step S212 is high, the state information of the dimension-reduced real-time channel is also sent only to the user equipment in the set of user equipment, and therefore, system overheads are under control.

Step S214: The base station processes downlink data and a user-specific demodulation reference signal by means of two-level precoding, and sends processed downlink data and a processed user-specific demodulation reference signal to the user equipment in the set of user equipment.

Step S216: After receiving the downlink data and the user-specific demodulation reference signal that are sent by the base station, the user equipment involved in multiple-input multiple-output demodulates the user-specific demodulation reference signal, estimates a data channel, and demodulates the downlink data.

It should be noted that the user equipment in the embodiment of FIG. 2 does not refer to one user equipment but to a user equipment side, including multiple to-be-scheduled user equipments and the user equipment in the set of user equipment involved in multiple-input multiple-output.

Figure 3:
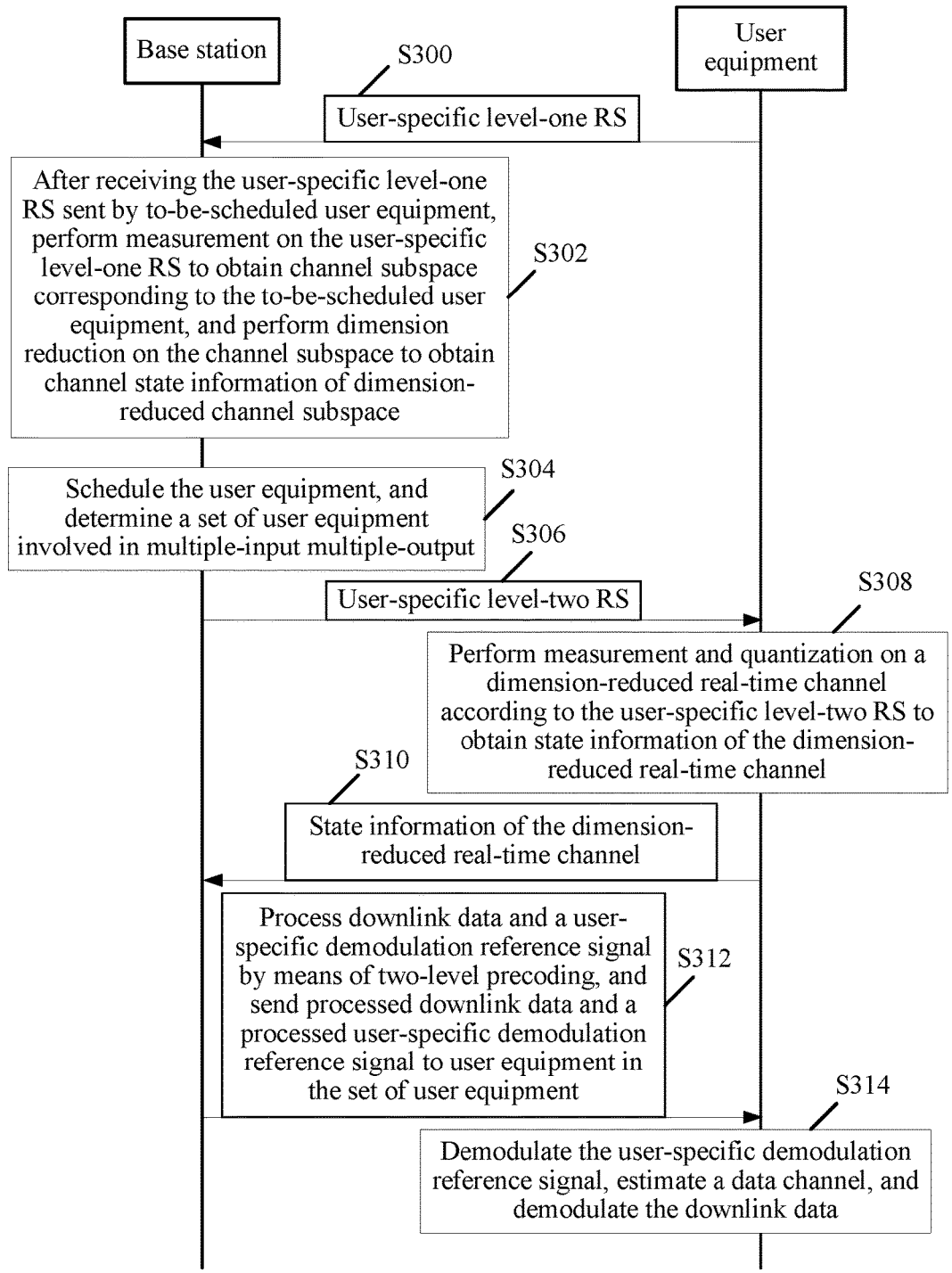
FIG. 3 is a schematic flowchart of another embodiment of a multiple-antenna data transmission method according to the present invention.

As shown in FIG. 3, FIG. 3 is a schematic flowchart of another embodiment of a multiple-antenna data transmission method according to the present invention, and the method includes:

Step S300: To-be-scheduled user equipment sends a user-specific level-one RS to a base station.

Specifically, the user-specific level-one RS is a level-one RS used by the base station to perform measurement to obtain channel state information of dimension-reduced channel subspace, and time-frequency density in executing step S300 is very low.

Step S302: After receiving the user-specific level-one RS sent by the to-be-scheduled user equipment, the base station measures the user-specific level-one RS to obtain channel subspace corresponding to the to-be-scheduled user equipment, and performs dimension reduction on the channel subspace to obtain channel state information of dimension-reduced channel subspace.

Step S304: The base station schedules the user equipment, and determines a set of user equipment involved in multiple-input multiple-output.

Step S306: The base station sends a user-specific level-two RS to user equipment in the set of user equipment.

Step S308: After receiving the user-specific level-two RS sent by the base station, the user equipment involved in multiple-input multiple-output performs measurement and quantization on a dimension-reduced real-time channel according to the user-specific level-two RS to obtain state information of the dimension-reduced real-time channel.

Step S310: Feed the state information of the dimension-reduced real-time channel back to the base station.

Step S312: The base station processes downlink data and a user-specific demodulation reference signal by means of two-level precoding, and sends processed downlink data and a processed user-specific demodulation reference signal to the user equipment in the set of user equipment.

Step S314: After receiving the downlink data and the user-specific demodulation reference signal that are sent by the base station, the user equipment involved in multiple-input multiple-output demodulates the user-specific demodulation reference signal, estimates a data channel, and demodulates the downlink data.

It can be understood that, for step S304 to step S314, reference may be made to step S206 to step S216 in the foregoing embodiment of FIG. 2, and details are not described herein again.

Figure 4:
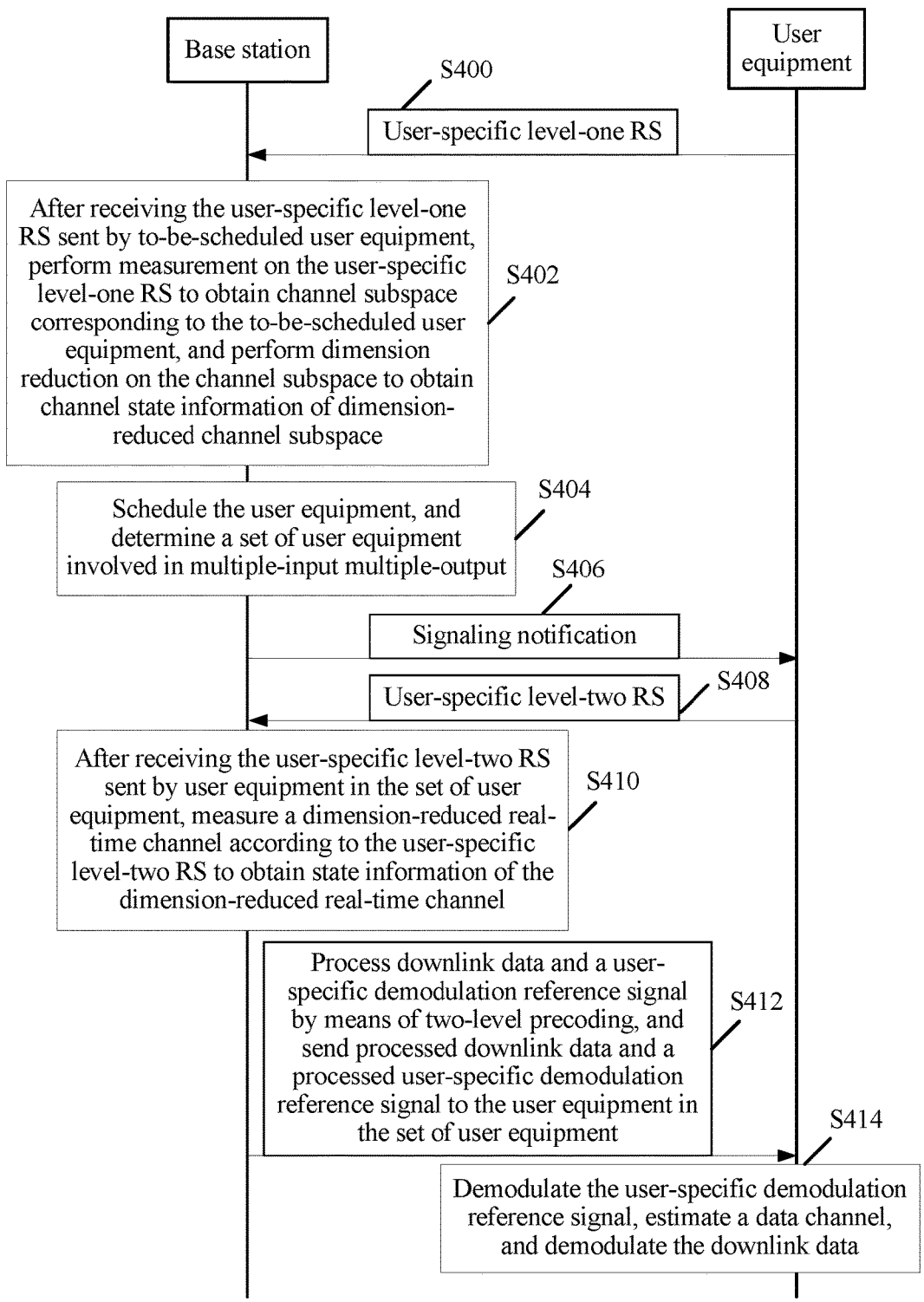
FIG. 4 is a schematic flowchart of another embodiment of a multiple-antenna data transmission method according to the present invention.

As shown in FIG. 4, FIG. 4 is a schematic flowchart of another embodiment of a multiple-antenna data transmission method according to the present invention, and the method includes:

Step S400: To-be-scheduled user equipment sends a user-specific level-one RS to a base station.

Step S402: After receiving the user-specific level-one RS sent by the to-be-scheduled user equipment, the base station measures the user-specific level-one RS to obtain channel subspace corresponding to the to-be-scheduled user equipment, and performs dimension reduction on the channel subspace to obtain channel state information of dimension-reduced channel subspace.

Step S404: The base station schedules the user equipment, and determines a set of user equipment involved in multiple-input multiple-output.

It can be understood that, for step S400 to step S404, reference may be made to step S300 to step S304 in the foregoing embodiment of FIG. 3, and details are not described herein again.

Step S406: The base station sends a signaling notification to user equipment in the set of user equipment.

Specifically, the signaling notification is used to instruct the user equipment in the set of user equipment to send a user-specific level-two RS to the base station.

Step S408: After receiving the signaling notification sent by the base station, the user equipment involved in multiple-input multiple-output sends a user-specific level-two RS to the base station.

Specifically, the user-specific level-two RS is a level-two RS used by the base station to perform measurement to obtain state information of a dimension-reduced real-time channel. Although time-frequency density in executing step S408 is high, the signaling notification is sent only to the user equipment in the set of user equipment, and therefore, system overheads are under control.

Step S410: After receiving the user-specific level-two RS sent by the user equipment in the set of user equipment, the base station measures a dimension-reduced real-time channel according to the user-specific level-two RS to obtain state information of the dimension-reduced real-time channel.

Step S412: The base station processes downlink data and a user-specific demodulation reference signal by means of two-level precoding, and sends processed downlink data and a processed user-specific demodulation reference signal to the user equipment in the set of user equipment.

Step S414: After receiving the downlink data and the user-specific demodulation reference signal that are sent by the base station, the user equipment involved in multiple-input multiple-output demodulates the user-specific demodulation reference signal, estimates a data channel, and demodulates the downlink data.

Figure 5:
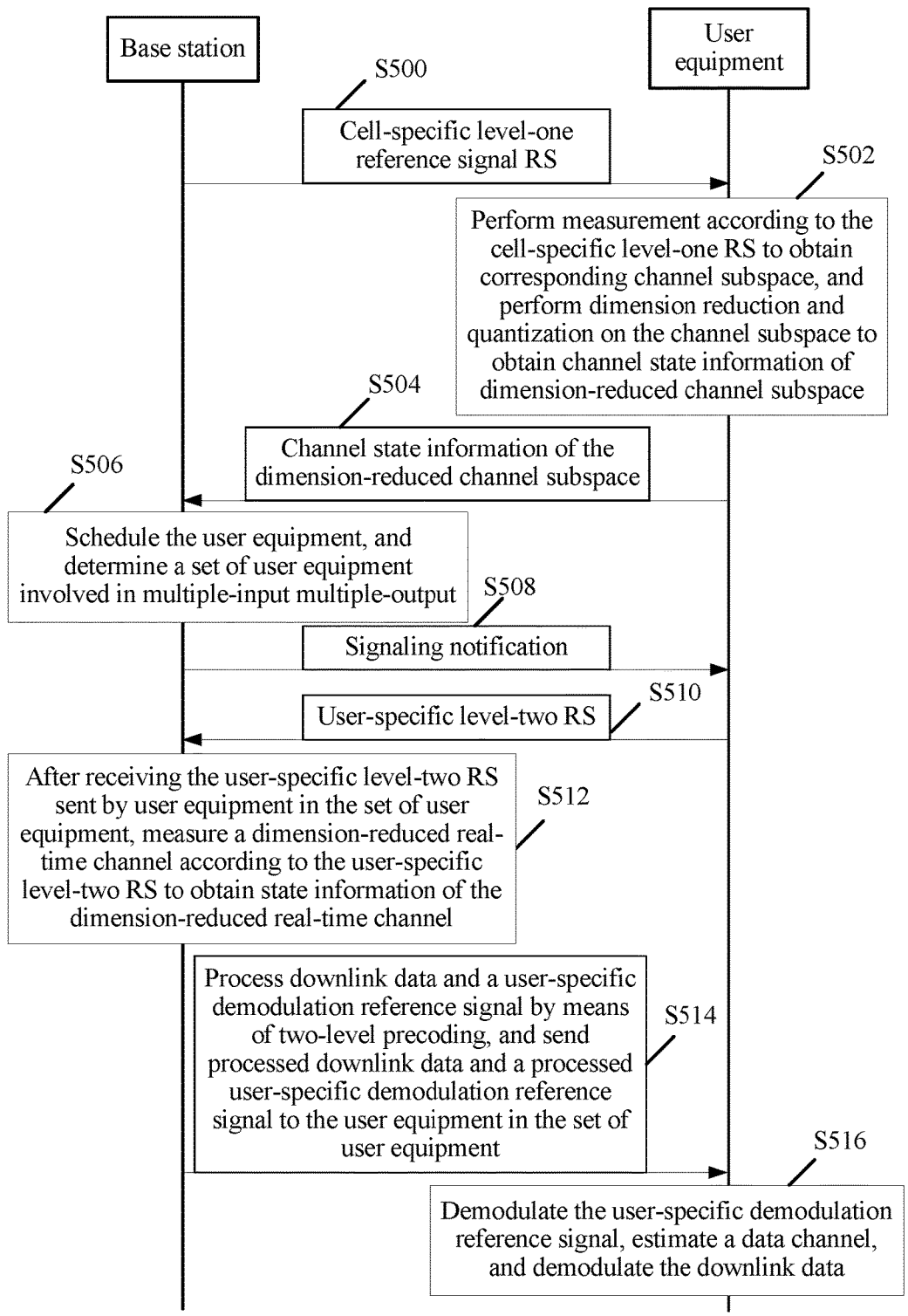
FIG. 5 is a schematic flowchart of another embodiment of a multiple-antenna data transmission method according to the present invention.

As shown in FIG. 5, FIG. 5 is a schematic flowchart of another embodiment of a multiple-antenna data transmission method according to the present invention, and the method includes:

Step S500: A base station sends a cell-specific level-one reference signal RS to user equipment.

Step S502: After receiving the cell-specific level-one RS sent by the base station, to-be-scheduled user equipment performs measurement according to the cell-specific level-one RS to obtain corresponding channel subspace, and performs dimension reduction and quantization on the channel subspace to obtain channel state information of dimension-reduced channel subspace.

Step S504: Feed the channel state information of the dimension-reduced channel subspace back to the base station.

Step S506: The base station schedules the user equipment, and determines a set of user equipment involved in multiple-input multiple-output.

Step S508: The base station sends a signaling notification to user equipment in the set of user equipment.

The signaling notification is used to instruct the user equipment in the set of user equipment to send a user-specific level-two RS to the base station.

Step S510: After receiving the signaling notification sent by the base station, the user equipment involved in multiple-input multiple-output sends a user-specific level-two RS to the base station.

The user-specific level-two RS is a level-two RS used by the base station to perform measurement to obtain state information of a dimension-reduced real-time channel.

Step S512: After receiving the user-specific level-two RS sent by the user equipment in the set of user equipment, the base station measures a dimension-reduced real-time channel according to the user-specific level-two RS to obtain state information of the dimension-reduced real-time channel.

Step S514: The base station processes downlink data and a user-specific demodulation reference signal by means of two-level precoding, and sends processed downlink data and a processed user-specific demodulation reference signal to the user equipment in the set of user equipment.

Step S516: After receiving the downlink data and the user-specific demodulation reference signal that are sent by the base station, the user equipment involved in multiple-input multiple-output demodulates the user-specific demodulation reference signal, estimates a data channel, and demodulates the downlink data.

It can be understood that, for step S500 to step S506, reference may be made to step S200 to step S206 in the embodiment of FIG. 2; for step S508 to step S516, reference may be made to step S406 to step S414 in the embodiment of FIG. 4, and details are not described herein again.

Figure 6:
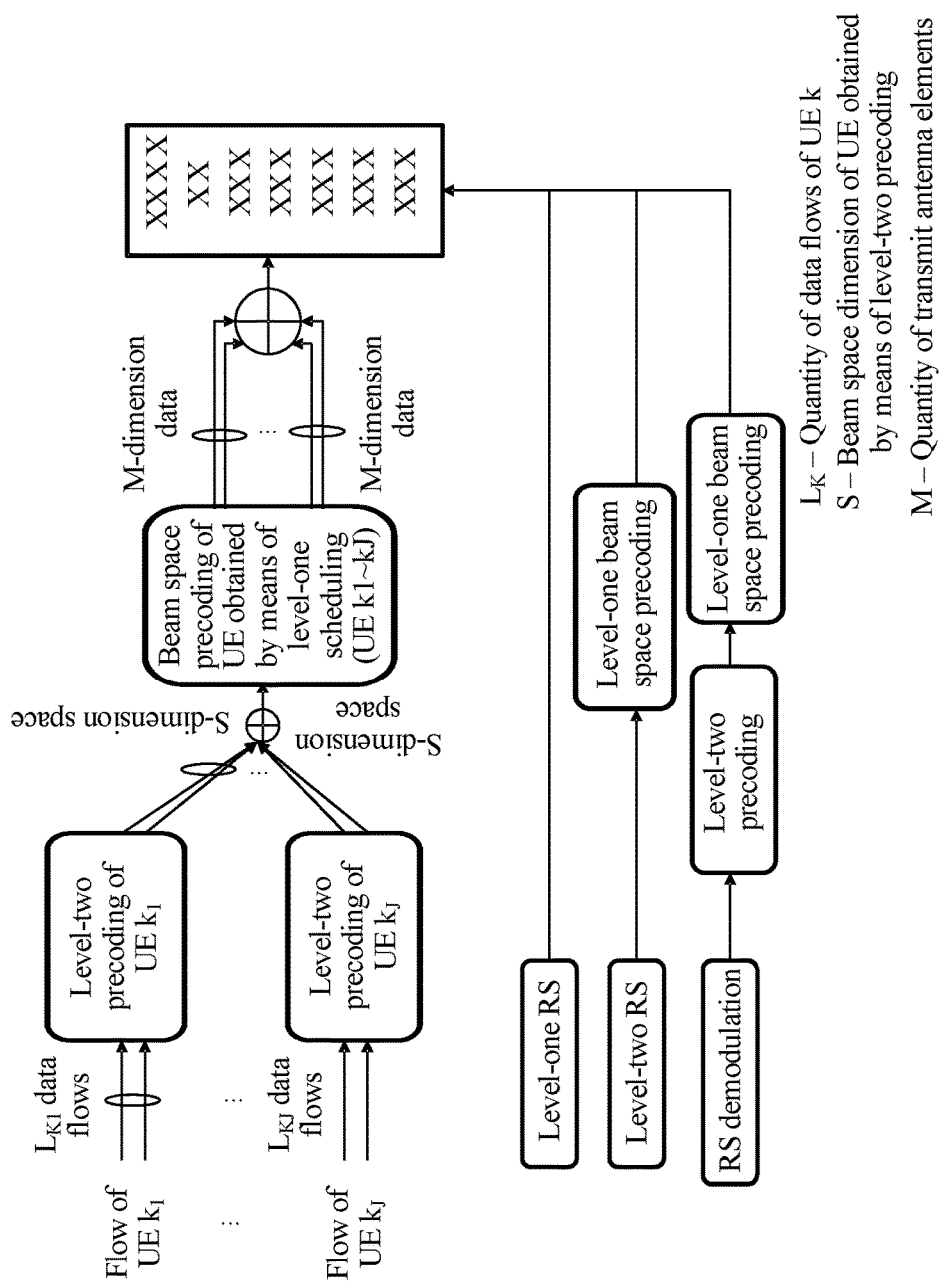
FIG. 6 is a schematic diagram of a two-level precoding structure according to the present invention.

It should be noted that an embodiment of the present invention further provides a two-level precoding structure designed to cooperate with a two-level RS to acquire CSI, as shown in FIG. 6.

A level-one RS in this embodiment of the present invention may be directly sent.

A level-two RS in this embodiment of the present invention may be sent after being multiplied by level-one beam space precoding (that is, first-level precoding corresponding to channel state information of channel subspace in this embodiment of the present invention), that is, a user-specific level-two RS in this embodiment of the present invention is a user-specific level-two RS which has been processed by means of the first-level precoding corresponding to the channel state information of the channel subspace.

A user-specific demodulation reference signal DM-RS in this embodiment of the present invention may be first multiplied by level-two precoding (that is, second-level precoding corresponding to state information of a real-time channel in this embodiment of the present invention) and then is multiplied by the level-one beam space precoding; then a result of the multiplying is sent.

Downlink data in this embodiment of the present invention is similar to the foregoing DM-RS, and may be first multiplied by the level-two precoding and then is multiplied by the level-one precoding; then a result of the multiplying is sent. FIG. 6 shows the precoding architecture by using MU-MIMO as an example. Assuming that there are K UEs, level-two precoding processing is separately performed on data flows of the K UEs to obtain a beam space dimension of UE with a space dimension S; then beam space precoding is performed on UE obtained by means of level-one scheduling, and finally M-dimension data is obtained and sent. It should be noted that the precoding architecture in FIG. 6 also supports SU-MIMO; when the precoding architecture is SU-MIMO, after CSI is acquired by using the level-one RS, there is only one to-be-scheduled data sending end, and there is only UE 1 in FIG. 6. It can be understood that the level-one precoding in this embodiment of the present invention may be implemented in a baseband (that is, performing level-one precoding in a frequency domain), or may be implemented in an intermediate/radio frequency (that is, performing level-two precoding in a time domain).

Figure 7:
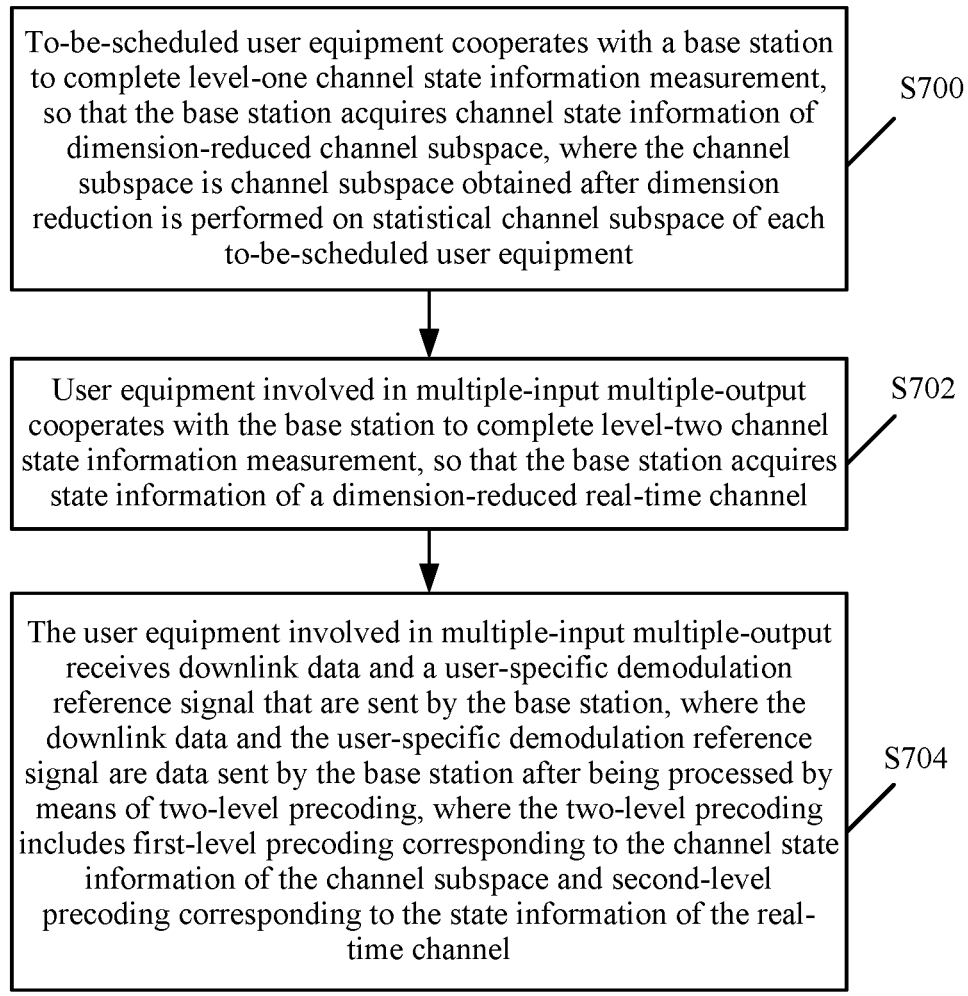
FIG. 7 is a schematic flowchart of another embodiment of a multiple-antenna data transmission method according to the present invention.

The following accordingly describes implementation manners in FIG. 1 to FIG. 5 in the present invention from a UE side with reference to a schematic flowchart, shown in FIG. 7, of another embodiment of a multiple-antenna data transmission method according to the present invention, and the method specifically includes:

Step S700: To-be-scheduled user equipment cooperates with a base station to complete level-one channel state information measurement, so that the base station acquires channel state information of dimension-reduced channel subspace, where the channel subspace is channel subspace obtained after dimension reduction is performed on statistical channel subspace of each to-be-scheduled user equipment.

Step S702: User equipment involved in multiple-input multiple-output cooperates with the base station to complete level-two channel state information measurement, so that the base station acquires state information of a dimension-reduced real-time channel.

Step S704: The user equipment involved in multiple-input multiple-output receives downlink data and a user-specific demodulation reference signal that are sent by the base station, where the downlink data and the user-specific demodulation reference signal are data sent by the base station after being processed by means of two-level precoding, and the two-level precoding includes first-level precoding corresponding to the channel state information of the channel subspace and second-level precoding corresponding to the state information of the real-time channel.

Specifically, step S700 may include: receiving, by the to-be-scheduled user equipment, a cell-specific level-one reference signal RS sent by the base station; performing measurement according to the cell-specific level-one RS to obtain corresponding channel subspace, and performing dimension reduction and quantization on the channel subspace to obtain the channel state information of the dimension-reduced channel subspace; and feeding the channel state information of the dimension-reduced channel subspace back to the base station.

Still specifically, step S700 may further include: sending, by the to-be-scheduled user equipment, a user-specific level-one RS to the base station, where the user-specific level-one RS is a level-one RS used by the base station to perform measurement to obtain the channel state information of the dimension-reduced channel subspace.

Further, step S702 may include: receiving, by the user equipment involved in multiple-input multiple-output, a user-specific level-two RS sent by the base station; performing measurement and quantization on the dimension-reduced real-time channel according to the user-specific level-two RS to obtain the state information of the dimension-reduced real-time channel; and feeding the state information of the dimension-reduced real-time channel back to the base station.

Still further, step S702 may further include: receiving, by the user equipment involved in multiple-input multiple-output, a signaling notification sent by the base station, where the signaling notification is used to instruct the user equipment to send a user-specific level-two RS to the base station; and sending the user-specific level-two RS to the base station, where the user-specific level-two RS is a level-two RS used by the base station to perform measurement to obtain the state information of the dimension-reduced real-time channel.

It should be noted that the user-specific level-two RS in this embodiment of the present invention is a user-specific level-two RS which has been processed by means of the first-level precoding corresponding to the channel state information of the channel subspace.

Still further, after step S704 in this embodiment of the present invention is performed, the method may further include: demodulating the user-specific demodulation reference signal, estimating a data channel, and demodulating the downlink data.

It can be understood that, for an implementation manner in this embodiment of the present invention in FIG. 7, reference may be made to implementation manners described in the foregoing embodiments in FIG. 1 to FIG. 6, and details are not described herein again.

It can be understood that, by using the multiple-antenna data transmission method provided in the present invention, system overheads may be greatly reduced. Specifically:

Assuming that a quantity of transmit antennas is M, a quantity of to-be-scheduled UE is $T_1$, a quantity of UE in a set of scheduled UE is $T_2$, and a quantity of antennas of the UE is N, overheads for acquiring CSI are effectively reduced by means of channel dimension reduction in this embodiment of the present invention, where the reduced overheads include (effects are achieved by comparing a one-level RS solution in LTE in the prior art and the solution of the present invention):

a. Downlink RS Overheads (Applicable to FDD/TDD):

in the one-level RS solution in LTE in the prior art, if average density of each transmit antenna in terms of time and frequency is x REs/ms/15 kHz, total density of RSs of the M transmit antennas is M*x REs/ms/15 kHz;

however, the downlink RS overheads in this embodiment of the present invention include two levels of RSs: If only channel subspace that changes slowly in terms of both time and frequency needs to be obtained for a level-one RS, density in both a time domain and a frequency domain can be reduced (for example, time density may be below ¼ of density of the level-one RS in LTE, and in terms of frequency, ½ of density of the level-one RS in LTE is considered), and density of the M transmit antennas may be generally controlled within M*x/8 REs/ms/15 kHz. if feedback of a change of a real-time channel needs to be supported for a level-two RS, average density of each space dimension in terms of time and frequency is also x REs/ms/15 kHz, and a dimension-reduced dimension S is generally equal to M/4; therefore, density of an S-dimension space antenna is M*x/4 REs/ms/15 kHz at most;

therefore, in terms of the downlink RS overheads, when the solution of the present invention is compared with the one-level RS solution in LTE in the prior art, RE overheads are reduced by $1-(M*x/4+M*x/8)/M*x=62.5\%$.

b. Uplink Feedback Overheads (Applicable to FDD/TDD, and it is Assumed that Each Downlink Sub-band Performs Feedback Once):

in the one-level RS solution in LTE in the prior art, feedback needs to be performed on all of the $T_1$ to-be-scheduled UEs. Assuming that time density of a quantity of REs occupied by feedback of each to-be-scheduled UE is y REs/ms/downlink sub-band, total time density of a quantity of REs occupied by the $T_1$ to-be-scheduled UEs is $T_1*y$ REs/ms/downlink sub-band;

however, in this embodiment of the present invention, feedback needs to be performed only for the $T_2$ UEs in the set of to-be-scheduled UE, and assuming that a quantity of REs occupied by feedback of each to-be-scheduled UE is consistent with that in the one-level RS solution in LTE, total time density of a quantity of REs occupied by the $T_2$ UEs in set of to-be-scheduled UE is $T_2*y$ REs/ms/downlink sub-band, where $T_2/T_1 \le 1/4$ even in a conservative case;

therefore, in terms of the uplink feedback overheads, when the solution of the present invention is compared with the one-level RS solution in LTE in the prior art, RE overheads are reduced by $1-T_2*y/(T_1*y)=75\%$.

c. Uplink RS Overheads (Applicable to TDD Only)

in the one-level RS solution in LTE in the prior art, an uplink RS needs to be sent to each of the $T_1$ to-be-scheduled UEs, and in terms of time and frequency, if average density of a quantity of REs occupied by each to-be-scheduled UE for sending an RS is z REs/ms/15 kHz, total density of RSs of the $T_1$ to-be-scheduled UEs is $T_1*z$ REs/ms/15 kHz;

however, the uplink RS overheads in this embodiment of the present invention include those of two levels of RSs: If only channel subspace that changes slowly in terms of both time and frequency needs to be obtained for a level-one RS, density in both a time domain and a frequency domain can be reduced (for example, time density may be below 1/4 of density of the level-one RS in LTE, and in terms of frequency, 1/2 of density of the level-one RS in LTE is considered), and RS density of the $T_1$ to-be-scheduled UEs may be generally controlled within $T_1*z/8$ REs/ms/15 kHz; if acquisition of a change of a real-time channel needs to be supported for a level-two RS, average density of each UE in the set of scheduled UE in terms of time and frequency is also z REs/ms/15 kHz, and therefore, density of a level-two RS of the $T_2$ UEs in the set of scheduled UE is $T_2*z/4$ REs/ms/15 kHz at most, where $T_2/T_1 \le 1/4$ even in a conservative case;

therefore, in terms of the uplink RS overheads, when the solution of the present invention is compared with the one-level RS solution in LTE in the prior art, RE overheads are reduced by $1-(T_2*z+T_1*z/8)/(T_1*z)=62.5\%$.

It may further be understood that after channel dimension reduction is performed in this embodiment of the present invention, computational complexity in acquiring level-two precoding decreases at a speed of a power of 3. For example, a dimension of an antenna array with 256 antenna elements is reduced to 32 dimensions, computational complexity can be reduced by $8^{\wedge}3=512$ multiples, and a corresponding processing delay is also reduced by 512 multiples, which are specifically shown in the following table:

| | Dimension reduction not performed on an antenna array with 256 antenna elements | Dimension of an antenna array with 256 antenna elements reduced to 32-dimension beam space |
|---|---|---|
| Precoding computational complexity | 163840 GFLOPS (Giga Floating-point Operations Per Second) | 320 GFLOPS (Giga Floating-point Operations Per Second) |

A very slow update speed of the level-one precoding is not a main bottleneck for resolving computational complexity, and therefore, acquiring SVD of the level-two precoding is main computational complexity in acquiring DL CSI. When an antenna array is reduced to 32 dimensions, a computation result is $27*32^{\wedge}3*6*100*3*1e3/5=320$ Gflops, where $27*32^{\wedge}3$ is SVD complexity of each sub-band, 6 is a quantity of multiply-add operations performed on real numbers, required in a multiply operation performed on complex numbers, 100 is a quantity of sub-bands (with a system bandwidth of 100 MHz), 3 is a quantity of sections, and 1e3/5 is a quantity of times for acquiring level-two CSI within one second.

It should be noted that from a perspective of system performance, there is a very small difference between performance of this embodiment of the present invention and rational system performance. The following provides descriptions by using SU-MIMO as an example, with reference to data effect diagrams, shown in FIG. 8 to FIG. 13, of comparisons between system performance in the present invention and ideal system performance, and from a perspective of a bit error rate BER and a signal-to-noise ratio SNR (dB).

Figure 8:
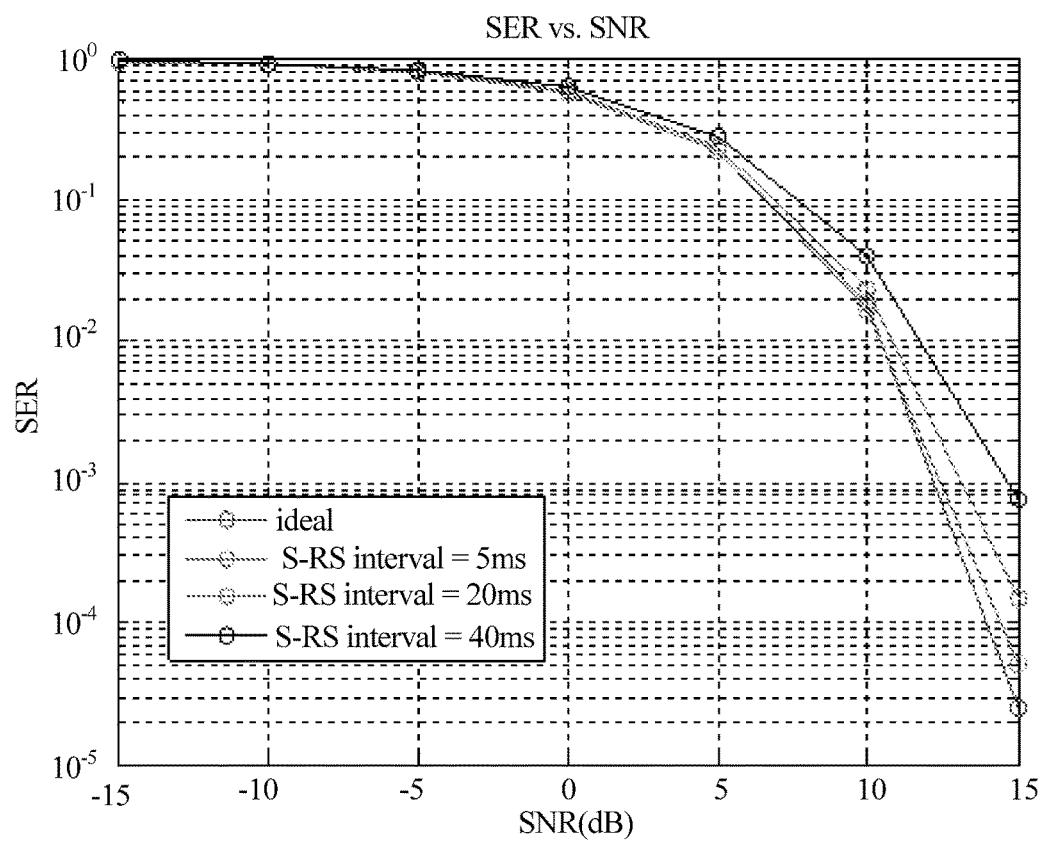
FIG. 8 is a data effect diagram of a comparison between system performance in the present invention and ideal system performance.

As shown in FIG. 8, FIG. 8 is a data effect diagram of a comparison between system performance in the present invention and ideal system performance. If a period for sending a level-one RS changes, there is always a small difference between the system performance in the present invention and the ideal system performance.

Figure 9:
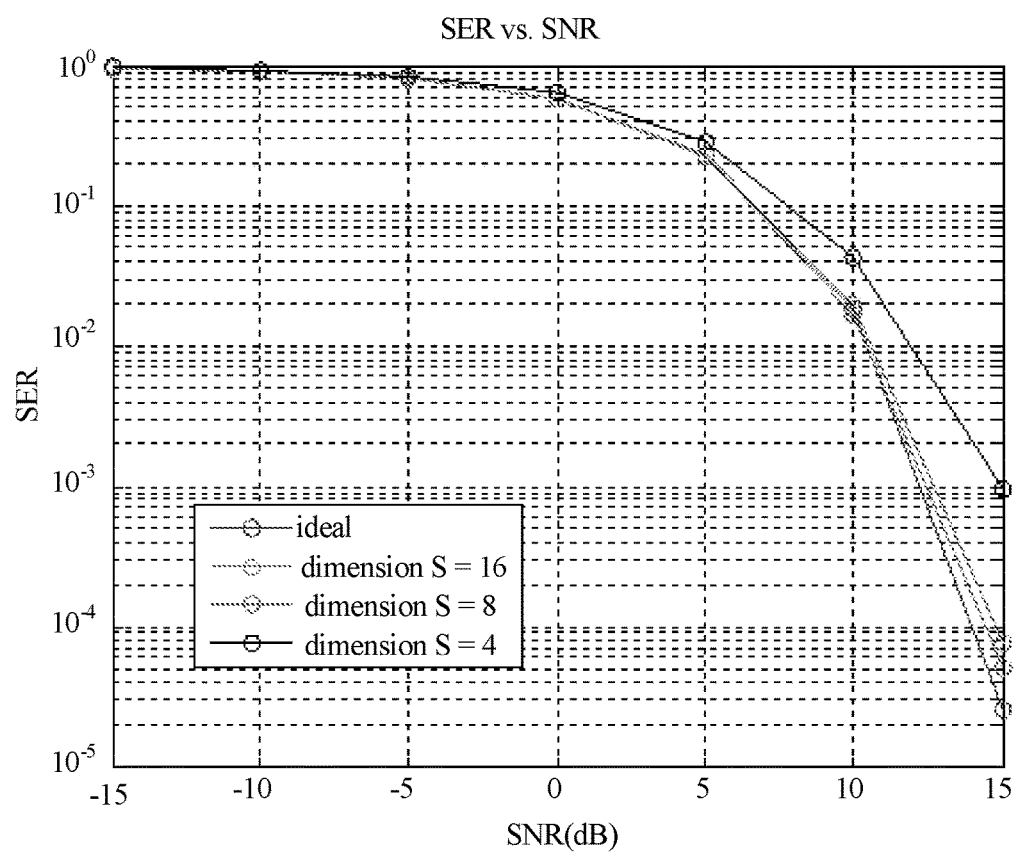
FIG. 9 is another data effect diagram of a comparison between system performance in the present invention and ideal system performance.

As shown in FIG. 9, FIG. 9 is another data effect diagram of a comparison between system performance in the present invention and ideal system performance. If a dimension in dimension reduction changes, there is always a small difference between the system performance in the present invention and the ideal system performance.

Figure 10:
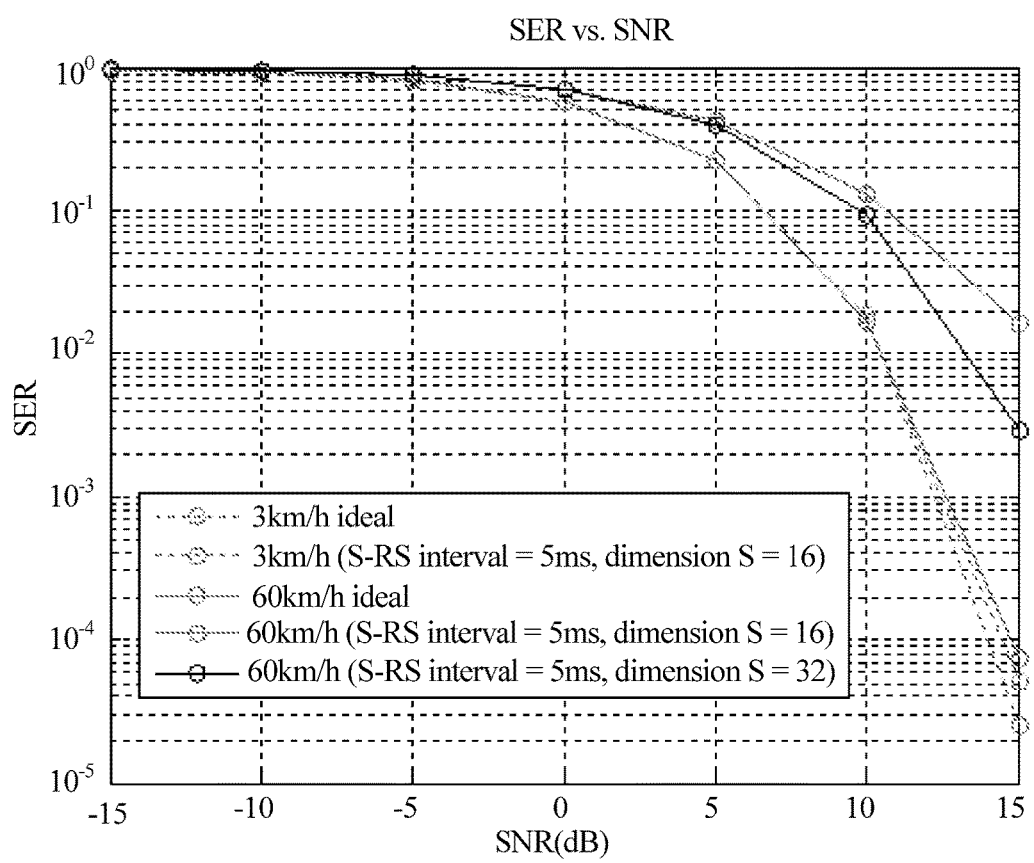
FIG. 10 is another data effect diagram of a comparison between system performance in the present invention and ideal system performance.

As shown in FIG. 10, FIG. 10 is another data effect diagram of a comparison between system performance in the present invention and ideal system performance. In a case in which UE mobility changes, at a low speed, there is a small difference between the system performance in the present invention and the ideal system performance, but at a medium/high speed, there is a larger difference between the system performance in the present invention and the ideal system performance (that is, there is a larger loss for the system performance in the present invention at the medium/high speed), and therefore, the present invention is mainly applicable to a low-speed scenario.

Figure 11:
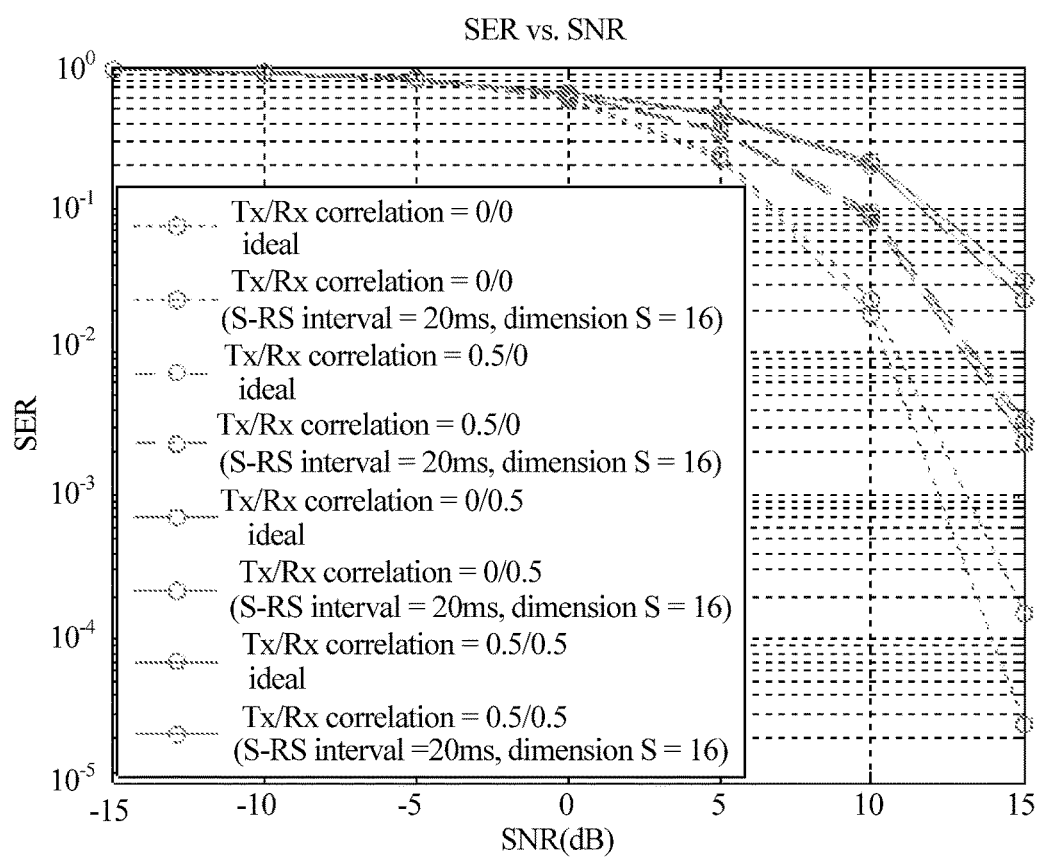
FIG. 11 is another data effect diagram of a comparison between system performance in the present invention and ideal system performance.

As shown in FIG. 11, FIG. 11 is another data effect diagram of a comparison between system performance in the present invention and ideal system performance. In a case in which correlation between a data sending end and a data receiving end changes, there is always a small difference between the system performance in the present invention and the ideal system performance.

Figure 12:
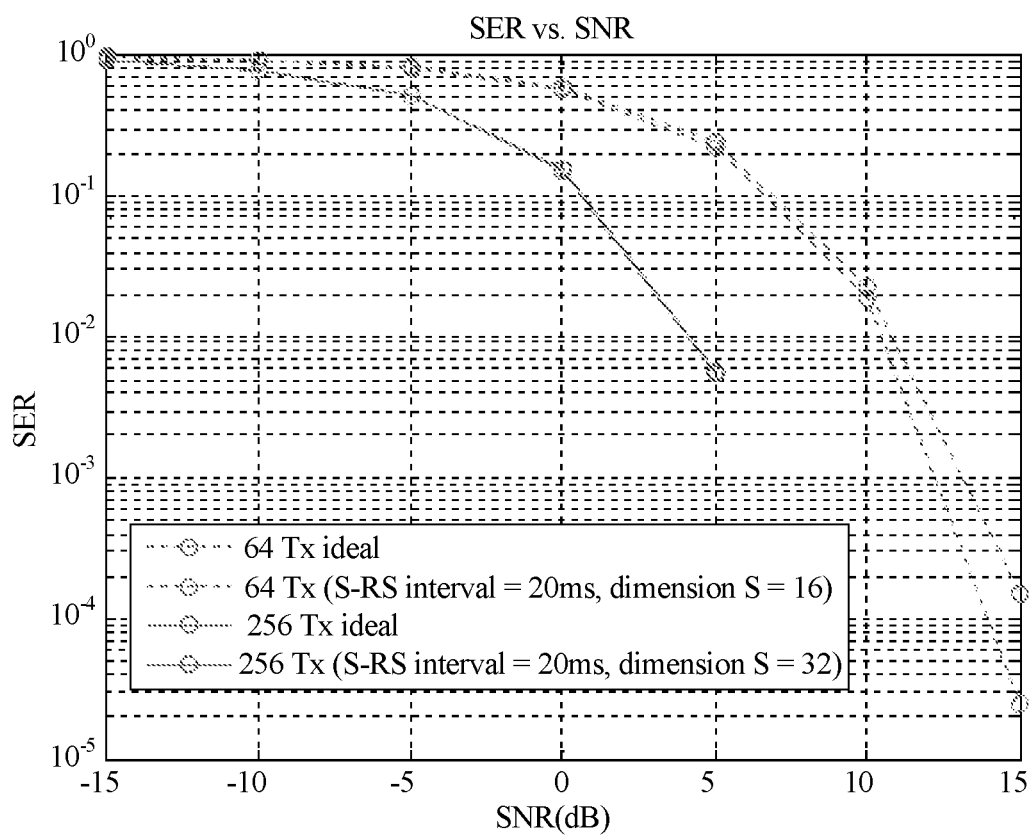
FIG. 12 is another data effect diagram of a comparison between system performance in the present invention and ideal system performance.

As shown in FIG. 12, FIG. 12 is another data effect diagram of a comparison between system performance in the present invention and ideal system performance. If a quantity of transmit antennas at a data sending end (a quantity of antennas is greater than or equal to 64) changes, there is always a small difference between the system performance in the present invention and the ideal system performance.

Figure 13:
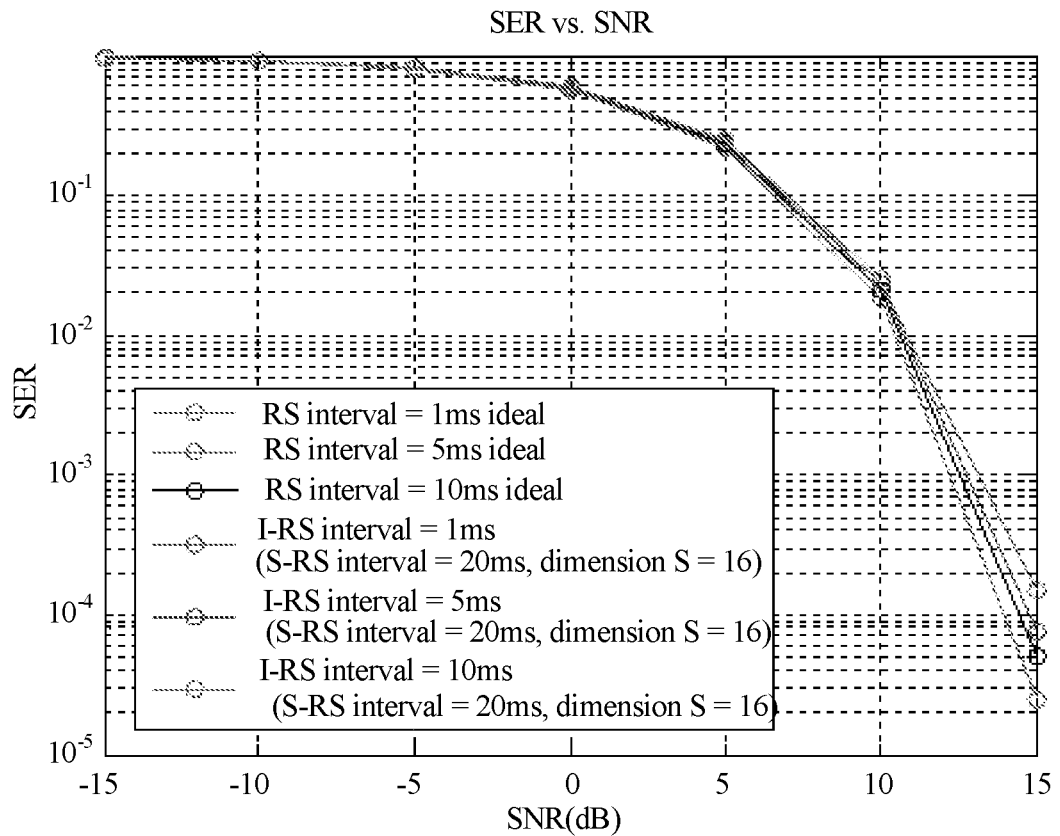
FIG. 13 is another data effect diagram of a comparison between system performance in the present invention and ideal system performance.

As shown in FIG. 13, FIG. 13 is another data effect diagram of a comparison between system performance in the present invention and ideal system performance. If a period for sending a level-two RS changes, there is always a small difference between the system performance in the present invention and the ideal system performance.

By implementing this embodiment of the present invention, channel state information of dimension-reduced channel subspace is acquired by means of level-one channel state information measurement, level-two channel state information measurement is performed on user equipment in a set of user equipment to acquire state information of a dimension-reduced real-time channel, downlink data and a user-specific demodulation reference signal are processed by means of two-level precoding, and processed downlink data and a processed user-specific demodulation reference signal are sent, which resolves a technical problem in the prior art that uplink and downlink pilot overheads are large and a quantity of uplink CSI feedbacks is large when a quantity of antennas at a data transmit end is relatively large (a quantity of to-be-served UE is also relatively large), so that more time-frequency resources in a system are available for data transmission, thereby effectively increasing a system throughout; in addition, by means of channel dimension reduction, a problem of high complexity in baseband processing in a system in the prior art can be resolved, thereby reducing requirements on a baseband processing capability.

Figure 14:
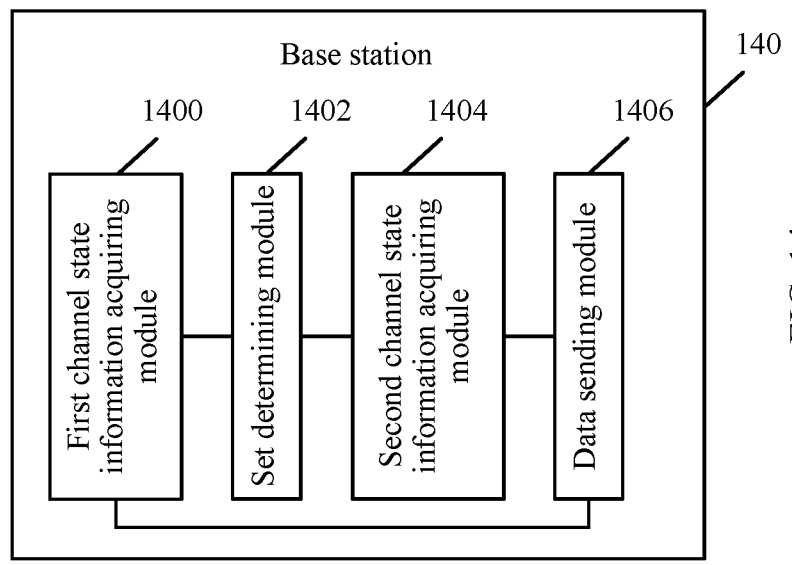
FIG. 14 is a schematic structural diagram of a base station according to an embodiment of the present invention.

To better implement the foregoing solutions in the embodiments of the present invention, with reference to a schematic structural diagram, shown in FIG. 14, of a base station according to an embodiment of the present invention, the following describes an implementation manner of an apparatus corresponding to the foregoing method. A base station 140 includes: a first channel state information acquiring module 1400, a set determining module 1402, a second channel state information acquiring module 1404, and a data sending module 1406.

The first channel state information acquiring module 1400 is configured to acquire channel state information of dimension-reduced channel subspace by means of level-one channel state information measurement, where the channel subspace is channel subspace obtained after dimension reduction is performed on statistical channel subspace of each to-be-scheduled user equipment.

The set determining module 1402 is configured to: schedule the user equipment, and determine a set of user equipment involved in multiple-input multiple-output.

The second channel state information acquiring module 1404 is configured to perform level-two channel state information measurement on user equipment in the set of user equipment to acquire state information of a dimension-reduced real-time channel.

The data sending module 1406 is configured to: process downlink data and a user-specific demodulation reference signal by means of two-level precoding, and send processed downlink data and a processed user-specific demodulation reference signal to the user equipment in the set of user equipment, where the two-level precoding includes first-level precoding corresponding to the channel state information of the channel subspace and second-level precoding corresponding to the state information of the real-time channel.

Figure 15:
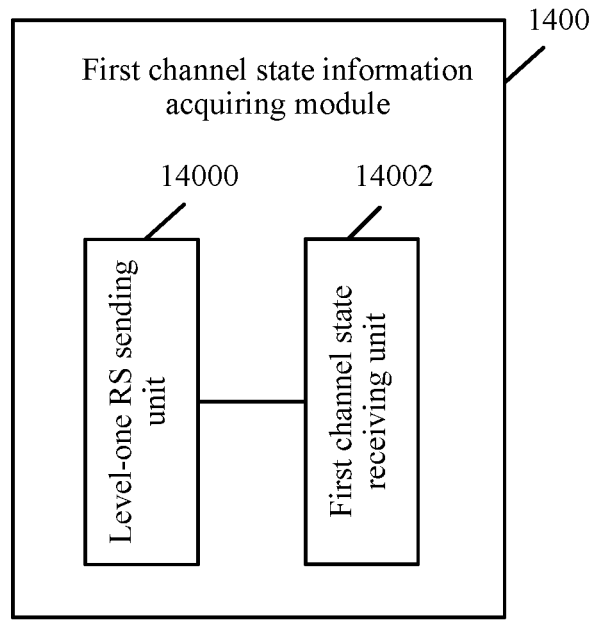
FIG. 15 is a schematic structural diagram of a first channel state information acquiring module according to the present invention.

Specifically, as shown in FIG. 15, FIG. 15 is a schematic structural diagram of a first channel state information acquiring module according to the present invention. The first channel state information acquiring module 1400 may include a level-one RS sending unit 14000 and a first channel state receiving unit 14002.

The level-one RS sending unit 14000 is configured to send a cell-specific level-one reference signal RS to the user equipment.

The first channel state receiving unit 14002 is configured to receive the channel state information, fed back by the to-be-scheduled user equipment, of the dimension-reduced channel subspace, where the channel state information of the channel subspace is channel state information, obtained after the to-be-scheduled user equipment performs measurement according to the cell-specific level-one RS to obtain corresponding channel subspace and performs dimension reduction and quantization on the channel subspace, of the channel subspace.

Figure 16:
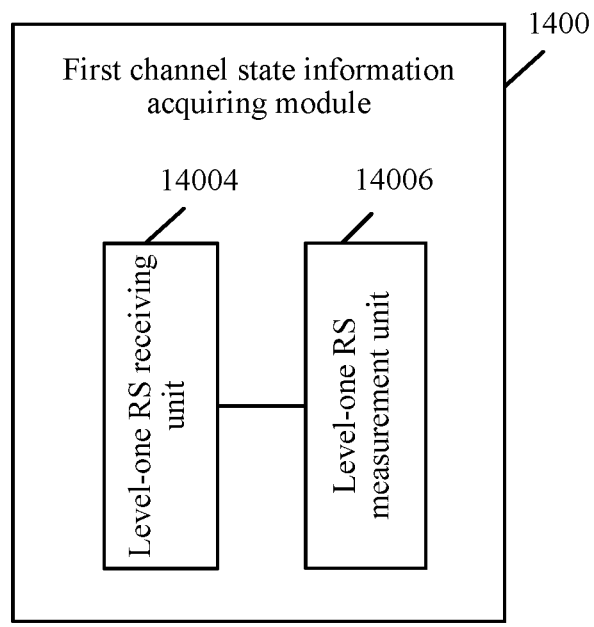
FIG. 16 is a schematic structural diagram of another embodiment of a first channel state information acquiring module according to the present invention.

Further, as shown in FIG. 16, FIG. 16 is a schematic structural diagram of another embodiment of a first channel state information acquiring module according to the present invention. The first channel state information acquiring module 1400 may include a level-one RS receiving unit 14004 and a level-one RS measurement unit 14006.

The level-one RS receiving unit 14004 is configured to receive a user-specific level-one RS sent by the to-be-scheduled user equipment.

The level-one RS measurement unit 14006 is configured to: measure the user-specific level-one RS to obtain channel subspace corresponding to the to-be-scheduled user equipment, and perform dimension reduction on the channel subspace to obtain the channel state information of the dimension-reduced channel subspace.

Figure 17:
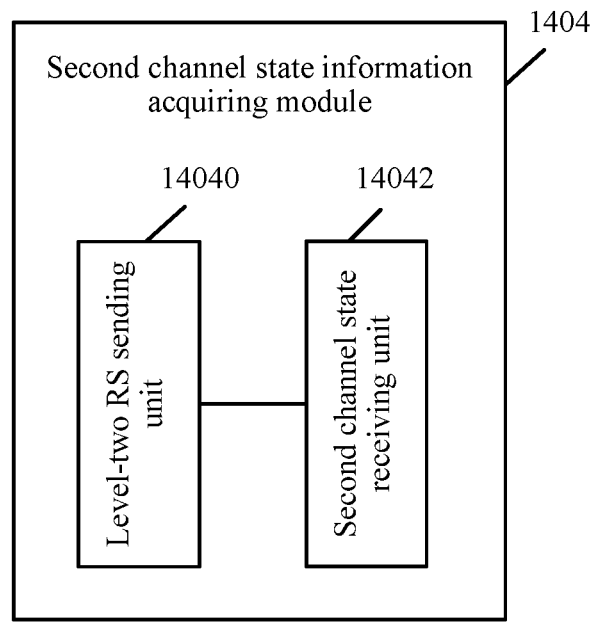
FIG. 17 is a schematic structural diagram of a second channel state information acquiring module according to the present invention.

Still further, as shown in FIG. 17, FIG. 17 is a schematic structural diagram of a second channel state information acquiring module according to the present invention. The second channel state information acquiring module 1404 may include a level-two RS sending unit 14040 and a second channel state receiving unit 14042.

The level-two RS sending unit 14040 is configured to send a user-specific level-two RS to the user equipment in the set of user equipment.

The second channel state receiving unit 14042 is configured to receive the state information, fed back by the user equipment in the set of user equipment, of the dimension-reduced real-time channel, where the state information of the dimension-reduced real-time channel is state information, obtained after the user equipment in the set of user equipment performs measurement and quantization on the dimension-reduced real-time channel according to the user-specific level-two RS, of the dimension-reduced real-time channel.

Figure 18:
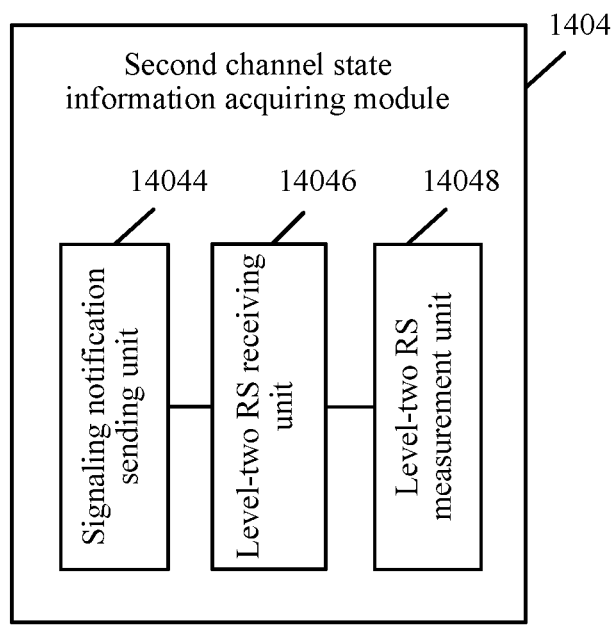
FIG. 18 is a schematic structural diagram of another embodiment of a second channel state information acquiring module according to the present invention.

Still further, as shown in FIG. 18, FIG. 18 is a schematic structural diagram of another embodiment of a second channel state information acquiring module according to the present invention. The second channel state information acquiring module 1404 may include a signaling notification sending unit 14044, a level-two RS receiving unit 14046, and a level-two RS measurement unit 14048.

The signaling notification sending unit 14044 is configured to send a signaling notification to the user equipment in the set of user equipment, where the signaling notification is used to instruct the user equipment in the set of user equipment to send a user-specific level-two RS to the base station.

The level-two RS receiving unit 14046 is configured to receive the user-specific level-two RS sent by the user equipment in the set of user equipment.

The level-two RS measurement unit 14048 is configured to measure the dimension-reduced real-time channel according to the user-specific level-two RS to obtain the state information of the dimension-reduced real-time channel.

It should be noted that the user-specific level-two RS in this embodiment of the present invention is a user-specific level-two RS which has been processed by means of the first-level precoding corresponding to the channel state information of the channel subspace.

Figure 19:
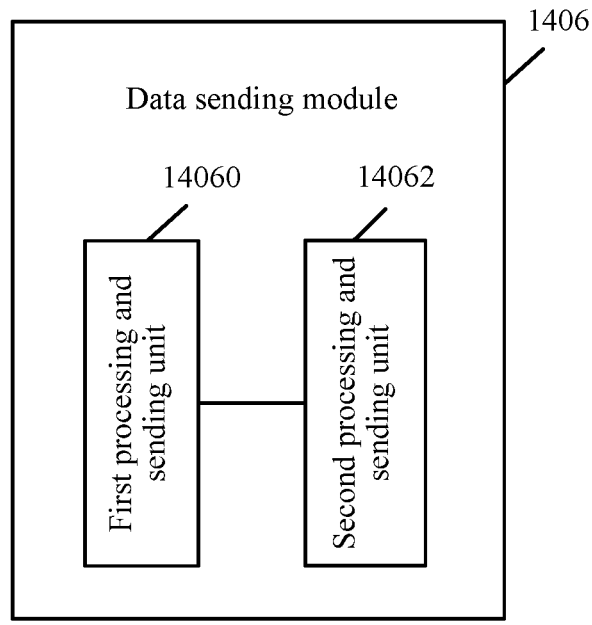
FIG. 19 is a schematic structural diagram of a data sending module according to the present invention.

Still further, as shown in FIG. 19, FIG. 19 is a schematic structural diagram of a data sending module according to the present invention. The data sending module 1406 may include a first processing and sending unit 14060 and a second processing and sending unit 14062.

The first processing and sending unit 14060 is configured to: multiply the downlink data by the second-level precoding corresponding to the state information of the real-time channel and then by the first-level precoding corresponding to the channel state information of the channel subspace, and send a result of the multiplying to the user equipment in the set of user equipment.

The second processing and sending unit 14062 is configured to: multiply the user-specific demodulation reference signal by the second-level precoding corresponding to the state information of the real-time channel and then by the first-level precoding corresponding to the channel state information of the channel subspace, and send a result of the multiplying to the user equipment in the set of user equipment.

It can be understood that, for a function of each module of the base station 140, reference may be accordingly made to specific implementation manners in the foregoing method embodiments, and details are not described herein again.

Figure 20:
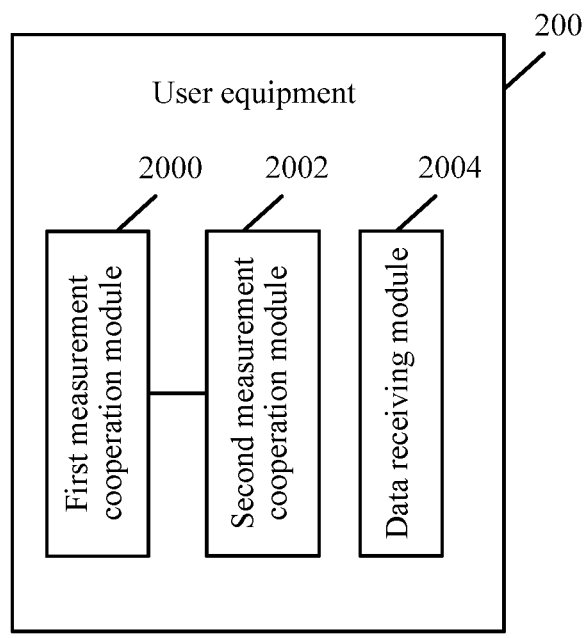
FIG. 20 is a schematic structural diagram of user equipment according to the present invention.

Corresponding to the foregoing method, the following describes an implementation manner of an apparatus with reference to a schematic structural diagram, shown in FIG. 20, of user equipment according to the present invention, user equipment 200 is to-be-scheduled user equipment and includes: a first measurement cooperation module 2000, a second measurement cooperation module 2002, and a data receiving module 2004.

The first measurement cooperation module 2000 is configured to cooperate with a base station to complete level-one channel state information measurement, so that the base station acquires channel state information of dimension-reduced channel subspace, where the channel subspace is channel subspace obtained after dimension reduction is performed on statistical channel subspace of each to-be-scheduled user equipment.

The second measurement cooperation module 2002 is configured to: when the user equipment is user equipment involved in multiple-input multiple-output, cooperate with the base station to complete level-two channel state information measurement, so that the base station acquires state information of a dimension-reduced real-time channel.

The data receiving module 2004 is configured to receive downlink data and a user-specific demodulation reference signal that are sent by the base station, where the downlink data and the user-specific demodulation reference signal are data sent by the base station after being processed by means of two-level precoding, and the two-level precoding includes first-level precoding corresponding to the channel state information of the channel subspace and second-level precoding corresponding to the state information of the real-time channel.

Figure 21:
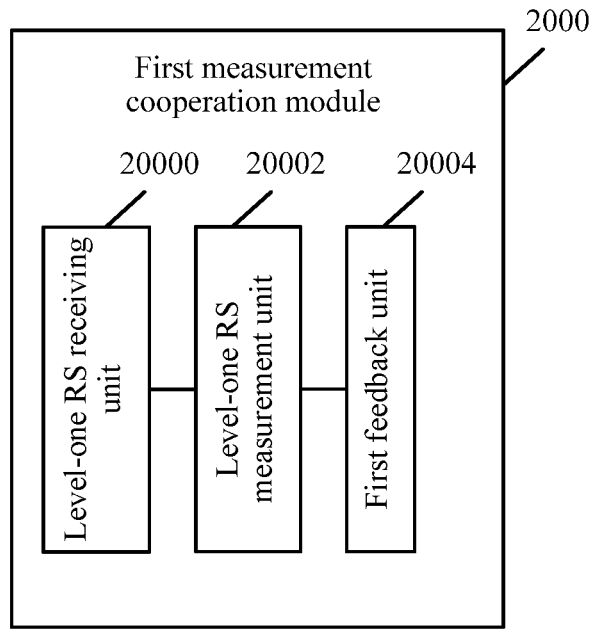
FIG. 21 is a schematic structural diagram of a first measurement cooperation module according to the present invention.

Specifically, as shown in FIG. 21, FIG. 21 is a schematic structural diagram of a first measurement cooperation module according to the present invention. The first measurement cooperation module 2000 may include a level-one RS receiving unit 20000, a level-one RS measurement unit 20002, and a first feedback unit 20004.

The level-one RS receiving unit 20000 is configured to receive a cell-specific level-one reference signal RS sent by the base station.

The level-one RS measurement unit 20002 is configured to: perform measurement according to the cell-specific level-one RS to obtain corresponding channel subspace, and perform dimension reduction and quantization on the channel subspace to obtain the channel state information of the dimension-reduced channel subspace.

The first feedback unit 20004 is configured to feed the channel state information of the dimension-reduced channel subspace back to the base station.

Further, the first measurement cooperation module 2000 provided in the present invention may further include a level-one RS sending unit, configured to send a user-specific level-one RS to the base station, where the user-specific level-one RS is a level-one RS used by the base station to perform measurement to obtain the channel state information of the dimension-reduced channel subspace.

Figure 22:
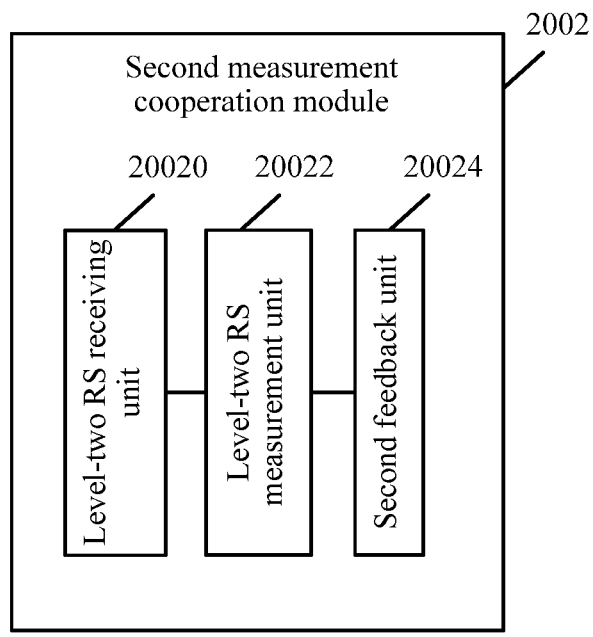
FIG. 22 is a schematic structural diagram of a second measurement cooperation module according to the present invention.

Still further, as shown in FIG. 22, FIG. 22 is a schematic structural diagram of a second measurement cooperation module according to the present invention. The second measurement cooperation module 2002 may include a level-two RS receiving unit 20020, a level-two RS measurement unit 20022, and a second feedback unit 20024.

The level-two RS receiving unit 20020 is configured to: when the user equipment is user equipment involved in multiple-input multiple-output, receive a user-specific level-two RS sent by the base station.

The level-two RS measurement unit 20022 is configured to perform measurement and quantization on the dimension-reduced real-time channel according to the user-specific level-two RS to obtain the state information of the dimension-reduced real-time channel.

The second feedback unit 20024 is configured to feed the state information of the dimension-reduced real-time channel back to the base station.

Figure 23:
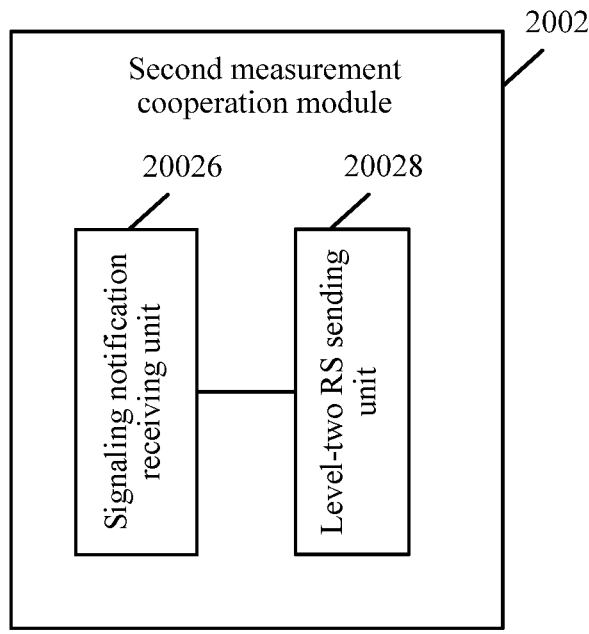
FIG. 23 is a schematic structural diagram of another embodiment of a second measurement cooperation module according to the present invention.

Still further, as shown in FIG. 23, FIG. 23 is a schematic structural diagram of another embodiment of a second measurement cooperation module according to the present invention. The second measurement cooperation module 2002 may include a signaling notification receiving unit 20026 and a level-two RS sending unit 20028.

The signaling notification receiving unit 20026 is configured to: when the user equipment is user equipment involved in multiple-input multiple-output, receive a signaling notification sent by the base station, where the signaling notification is used to instruct the user equipment to send a user-specific level-two RS to the base station.

The level-two RS sending unit 20028 is configured to send the user-specific level-two RS to the base station, where the user-specific level-two RS is a level-two RS used by the base station to perform measurement to obtain the state information of the dimension-reduced real-time channel.

It should be noted that the user-specific level-two RS in this embodiment of the present invention is a user-specific level-two RS which has been processed by means of the first-level precoding corresponding to the channel state information of the channel subspace.

Figure 24:
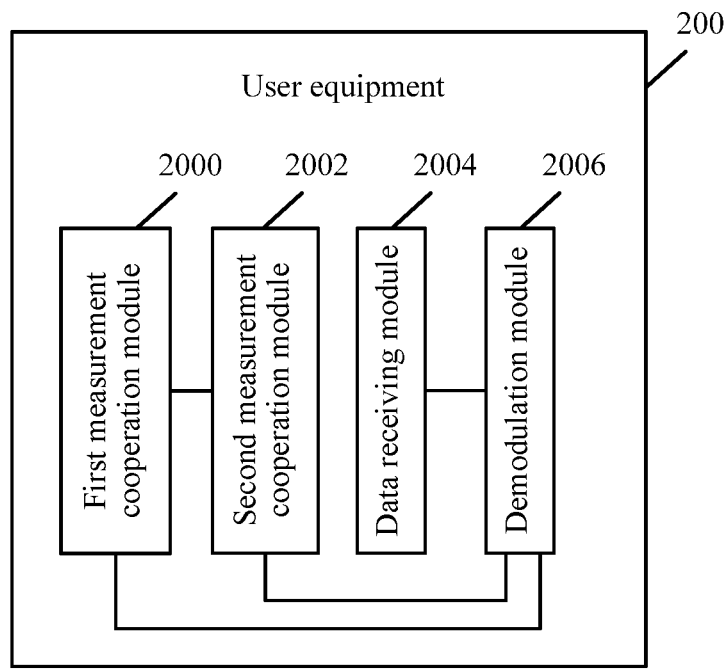
FIG. 24 is a schematic structural diagram of another embodiment of user equipment according to the present invention.

Still further, as shown in FIG. 24, FIG. 24 is a schematic structural diagram of another embodiment of user equipment according to the present invention. The user equipment 200 includes the first measurement cooperation module 2000, the second measurement cooperation module 2002, and the data receiving module 2004, and may further include a demodulation module 2006, configured to: after the data receiving module 2004 receives the downlink data and the user-specific demodulation reference signal that are sent by the base station, demodulate the user-specific demodulation reference signal, estimate a data channel, and demodulate the downlink data.

It can be understood that the user equipment 200 includes but is not limited another electronic device such as a mobile terminal, a tablet, or a personal digital assistant. For a function of each module in the user equipment 200, reference may be correspondingly made to specific implementation manners in the foregoing method embodiments, and details are not described herein again.

Figure 25:
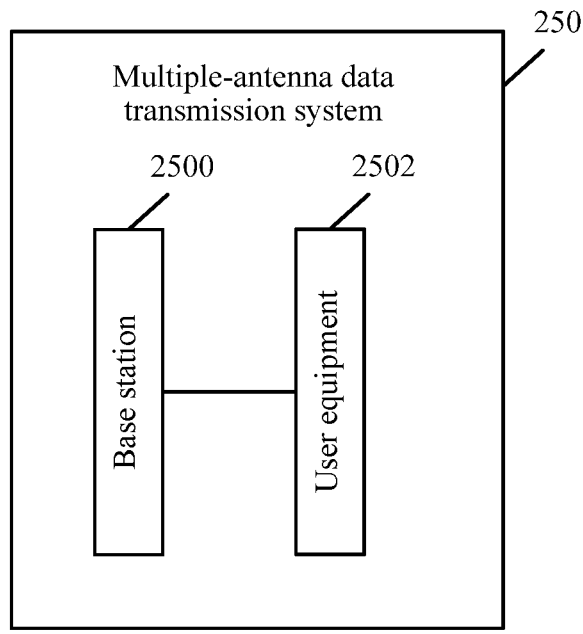
FIG. 25 is a schematic structural diagram of a multiple-antenna data transmission system according to the present invention.

Further, as shown in FIG. 25, FIG. 25 is a schematic structural diagram of a multiple-antenna data transmission system according to the present invention. The present invention further provides a multiple-antenna data transmission system 250, including a base station 2500 and user equipment 2502.

The base station 2500 may be the base station 140 in any embodiment of the foregoing FIG. 14 to FIG. 19; the user equipment 2502 may be the user equipment 200 in any embodiment of the foregoing FIG. 20 to FIG. 24, and details are not described herein again.

To better implement the foregoing solutions in the embodiments of the present invention, the present invention further provides a related device configured to cooperate in implementing the foregoing solutions. The following provides a detailed description with reference to a schematic structural diagram, shown in FIG. 26, of another embodiment of a base station according to the present invention.

Figure 26:
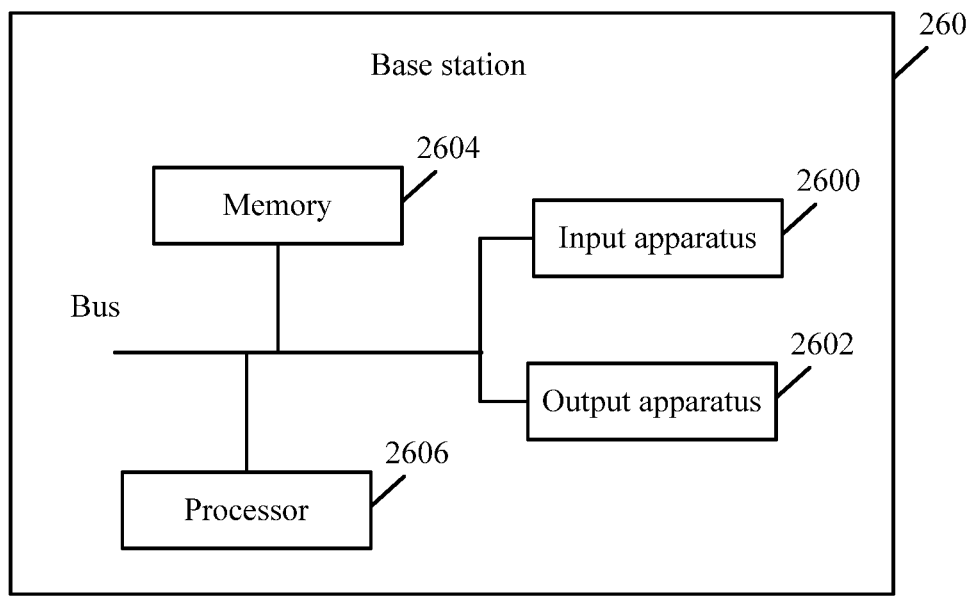
FIG. 26 is a schematic structural diagram of another embodiment of a base station according to the present invention.

A base station 260 includes: an input apparatus 2600, an output apparatus 2602, a memory 2604, and a processor 2606 (there may be one or more processors 2606 in the base station 260, and one processor is used as an example in FIG. 26). In some embodiments of the present invention, the input apparatus 2600, the output apparatus 2602, the memory 2604, and the processor 2606 may be connected by using a bus or in another manner. For example, the input apparatus 2600, the output apparatus 2602, the memory 2604, and the processor 2606 are connected by using a bus in FIG. 26.

The memory 2604 is configured to store program code, and the processor 2606 is configured to invoke the program code stored in the memory, to execute the following steps:

acquiring channel state information of dimension-reduced channel subspace by means of level-one channel state information measurement, where the channel subspace is channel subspace obtained after dimension reduction is performed on statistical channel subspace of each to-be-scheduled user equipment; scheduling the user equipment, determining a set of user equipment involved in multiple-input multiple-output, and performing level-two channel state information measurement on user equipment in the set of user equipment to acquire state information of a dimension-reduced real-time channel; and processing downlink data and a user-specific demodulation reference signal by means of two-level precoding, and sending processed downlink data and a processed user-specific demodulation reference signal to the user equipment in the set of user equipment by using the output apparatus 2602, where the two-level precoding includes first-level precoding corresponding to the channel state information of the channel subspace and second-level precoding corresponding to the state information of the real-time channel.

Specifically, that the processor 2606 acquires channel state information of dimension-reduced channel subspace by means of level-one channel state information measurement includes:

sending a cell-specific level-one reference signal RS to the user equipment by using the output apparatus 2602; and receiving, by using the input apparatus 2600, the channel state information, fed back by the to-be-scheduled user equipment, of the dimension-reduced channel subspace, where the channel state information of the channel subspace is channel state information, obtained after the to-be-scheduled user equipment performs measurement according to the cell-specific level-one RS to obtain corresponding channel subspace and performs dimension reduction and quantization on the channel subspace, of the channel subspace.

Further, that the processor 2606 acquires channel state information of dimension-reduced channel subspace by means of level-one channel state information measurement includes:

receiving, by using the input apparatus 2600, a user-specific level-one RS sent by the to-be-scheduled user equipment; and measuring the user-specific level-one RS to obtain channel subspace corresponding to the to-be-scheduled user equipment, and performing dimension reduction on the channel subspace to obtain the channel state information of the dimension-reduced channel subspace.

Still further, that the processor 2606 performs level-two channel state information measurement on user equipment in the set of user equipment to acquire state information of a dimension-reduced real-time channel includes:

sending, by using the output apparatus 2602, a user-specific level-two RS to the user equipment in the set of user equipment; and receiving, by using the input apparatus 2600, the state information, fed back by the user equipment in the set of user equipment, of the dimension-reduced real-time channel, where the state information of the dimension-reduced real-time channel is state information, obtained after the user equipment in the set of user equipment performs measurement and quantization on the dimension-reduced real-time channel according to the user-specific level-two RS, of the dimension-reduced real-time channel.

Still further, that the processor 2606 performs level-two channel state information measurement on user equipment in the set of user equipment to acquire state information of a dimension-reduced real-time channel includes:

sending, by using the output apparatus 2602, a signaling notification to the user equipment in the set of user equipment, where the signaling notification is used to instruct the user equipment in the set of user equipment to send a user-specific level-two RS to the base station; receiving, by using the input apparatus 2600, the user-specific level-two RS sent by the user equipment in the set of user equipment; and measuring the dimension-reduced real-time channel according to the user-specific level-two RS to obtain the state information of the dimension-reduced real-time channel.

Still further, the user-specific level-two RS is a user-specific level-two RS which has been processed by means of the first-level precoding corresponding to the channel state information of the channel subspace.

Still further, that the processor 2606 processes downlink data and a user-specific demodulation reference signal by means of two-level precoding, and sends processed downlink data and a processed user-specific demodulation reference signal to the user equipment in the set of user equipment includes:

multiplying the downlink data by the second-level precoding corresponding to the state information of the real-time channel and then by the first-level precoding corresponding to the channel state information of the channel subspace, and sending a result of the multiplying to the user equipment in the set of user equipment by using the output apparatus 2602; and multiplying the user-specific demodulation reference signal by the second-level precoding corresponding to the state information of the real-time channel and then by the first-level precoding corresponding to the channel state information of the channel subspace, and sending a result of the multiplying to the user equipment in the set of user equipment by using the output apparatus 2602.

It can be understood that functions of all function modules in the base station 260 may be specifically implemented according to the methods in the foregoing method embodiments, and details are not described herein again.

Figure 27:
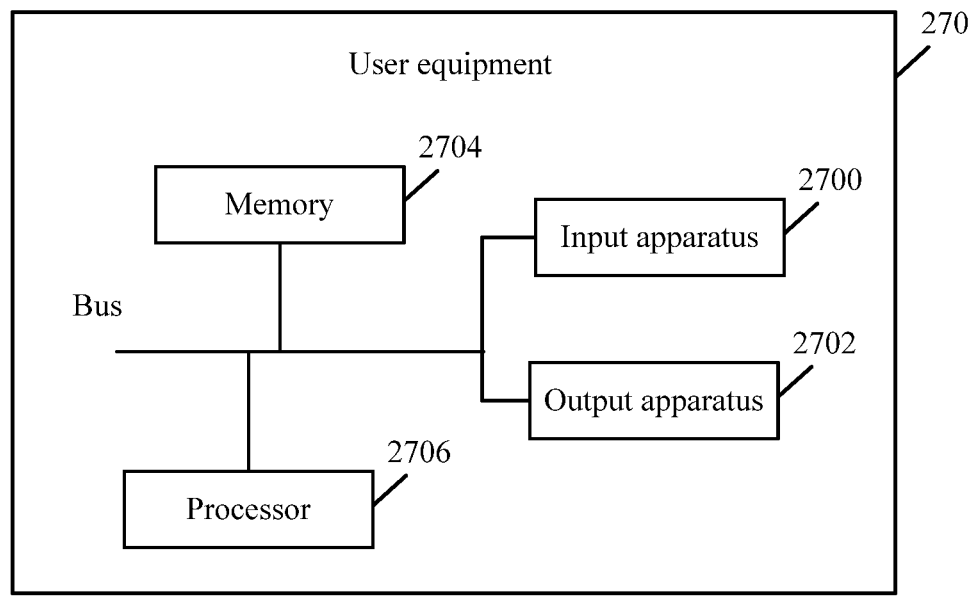
FIG. 27 is a schematic structural diagram of another embodiment of user equipment according to the present invention.

The following provides a detailed description with reference to a schematic structural diagram, shown in FIG. 27, of another embodiment of user equipment according to the present invention.

User equipment 270 includes: an input apparatus 2700, an output apparatus 2702, a memory 2704, and a processor 2706 (there may be one or more processors 2706 in the user equipment 270, and one processor is used as an example in FIG. 27). In some embodiments of the present invention, the input apparatus 2700, the output apparatus 2702, the memory 2704, and the processor 2706 may be connected by using a bus or in another manner. For example, the input apparatus 2700, the output apparatus 2702, the memory 2704, and the processor 2706 are connected by using a bus in FIG. 27.

The memory 2704 is configured to store program code, and the processor 2706 is configured to invoke the program code stored in the memory, to execute the following steps:

cooperating with a base station to complete level-one channel state information measurement, so that the base station acquires channel state information of dimension-reduced channel subspace, where the channel subspace is channel subspace obtained after dimension reduction is performed on statistical channel subspace of each to-be-scheduled user equipment; when the user equipment is user equipment involved in multiple-input multiple-output, cooperating with the base station to complete level-two channel state information measurement, so that the base station acquires state information of a dimension-reduced real-time channel; and receiving, by using the input apparatus 2700, downlink data and a user-specific demodulation reference signal that are sent by the base station, where the downlink data and the user-specific demodulation reference signal are data sent by the base station after being processed by means of two-level precoding, and the two-level precoding includes first-level precoding corresponding to the channel state information of the channel subspace and second-level precoding corresponding to the state information of the real-time channel.

Specifically, that the processor 2706 cooperates with a base station to complete level-one channel state information measurement, so that the base station acquires channel state information of dimension-reduced channel subspace includes:

receiving, by using the input apparatus 2700, a cell-specific level-one reference signal RS sent by the base station; performing measurement according to the cell-specific level-one RS to obtain corresponding channel subspace, and performing dimension reduction and quantization on the channel subspace to obtain the channel state information of the dimension-reduced channel subspace; and feeding the channel state information of the dimension-reduced channel subspace back to the base station by using the output apparatus 2702.

Further, that the processor 2706 cooperates with a base station to complete level-one channel state information measurement, so that the base station acquires channel state information of dimension-reduced channel subspace includes:

sending, by using the output apparatus 2702, a user-specific level-one RS to the base station, where the user-specific level-one RS is a level-one RS used by the base station to perform measurement to obtain the channel state information of the dimension-reduced channel subspace.

Still further, that the processor 2706 cooperates with the base station to complete level-two channel state information measurement, so that the base station acquires state information of a dimension-reduced real-time channel includes:

receiving, by using the input apparatus 2700, a user-specific level-two RS sent by the base station; performing measurement and quantization on the dimension-reduced real-time channel according to the user-specific level-two RS to obtain the state information of the dimension-reduced real-time channel; and feeding the state information of the dimension-reduced real-time channel back to the base station by using the output apparatus 2702.

Still further, that the processor 2706 cooperates with the base station to complete level-two channel state information measurement, so that the base station acquires state information of a dimension-reduced real-time channel includes:

receiving, by using the input apparatus 2700, a signaling notification sent by the base station, where the signaling notification is used to instruct the user equipment to send a user-specific level-two RS to the base station; and sending the user-specific level-two RS to the base station by using the output apparatus 2702, where the user-specific level-two RS is a level-two RS used by the base station to perform measurement to obtain the state information of the dimension-reduced real-time channel.

Still further, the user-specific level-two RS is a user-specific level-two RS processed by means of the first-level precoding corresponding to the channel state information of the channel subspace.

Still further, after receiving downlink data and a user-specific demodulation reference signal that are sent by the base station, the processor 2706 further executes:

demodulating the user-specific demodulation reference signal, estimating a data channel, and demodulating the downlink data.

It can be understood that functions of all function modules in the user equipment 270 may be specifically implemented according to the methods in the foregoing method embodiments, and details are not described herein again.

Figure 28:
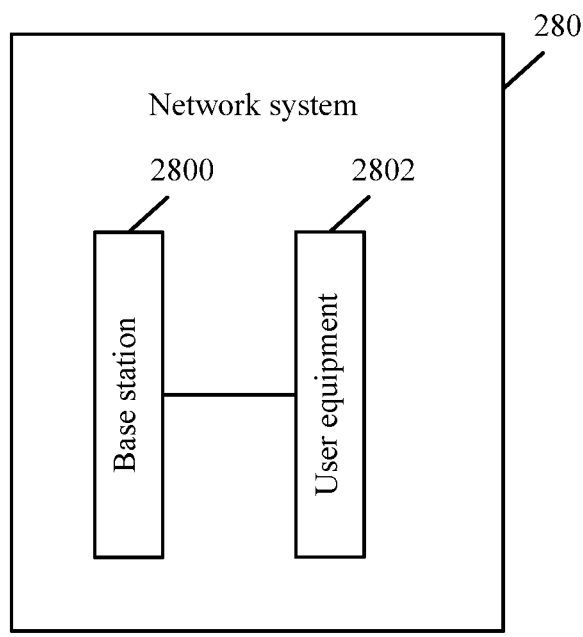
FIG. 28 is a schematic structural diagram of a network system according to the present invention.

As shown in FIG. 28, FIG. 28 is a schematic structural diagram of a network system according to the present invention. A network system 280 includes a base station 2800 and user equipment 2802.

The base station 2800 may be the base station 260 in the foregoing embodiment of FIG. 26; the user equipment 2802 may be the user equipment 270 in the foregoing embodiment of FIG. 27, and details are not described herein again. It can be understood that the network system 280 in this embodiment of the present invention may further include a device such as a server or a service center.

In conclusion, by implementing this embodiment of the present invention, channel state information of dimension-reduced channel subspace is acquired by means of level-one channel state information measurement, level-two channel state information measurement is performed on user equipment in a set of user equipment to acquire state information of a dimension-reduced real-time channel, downlink data and a user-specific demodulation reference signal are processed by means of two-level precoding, and processed downlink data and a processed user-specific demodulation reference signal are sent, which resolves a technical problem in the prior art that uplink and downlink pilot overheads are large and a quantity of uplink CSI feedbacks is large when a quantity of antennas at a data transmit end is relatively large (a quantity of to-be-served UE is also relatively large), so that more time-frequency resources in a system are available for data transmission, thereby effectively increasing a system throughout; in addition, by means of channel dimension reduction, a problem of high complexity in baseband processing in a system in the prior art can be resolved, thereby reducing requirements on a baseband processing capability.

A person of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The foregoing storage medium may include: a magnetic disk, an optical disc, a read-only memory (Read-Only Memory, ROM), or a random access memory (Random Access Memory, RAM).

What is disclosed above is merely exemplary embodiments of the present invention, and certainly is not intended to limit the protection scope of the present invention. A person of ordinary skill in the art may understand that all or some of processes that implement the foregoing embodiments and equivalent modifications made in accordance with the claims of the present invention shall fall within the scope of the present invention.

What is claimed is:

1. A multiple-antenna data transmission method, comprising:
    acquiring, by a base station, channel state information of dimension-reduced channel subspace by performing a level-one channel state measurement, wherein the channel subspace is a channel subspace determined by performing a dimension reduction on statistical channel subspace of user equipment; and
    performing a level-two channel state information measurement on the user equipment to acquire state information of a dimension-reduced real-time channel; and
    processing, by the base station, downlink data and a user-specific demodulation reference signal by applying two-level precoding; and
    sending processed downlink data and a processed user-specific demodulation reference signal to the user equipment, wherein the two-level precoding further comprises:
    first-level precoding corresponding to the channel state information of the channel subspace; and
    second-level precoding corresponding to the state information of the real-time channel.

2. The method according to claim 1, wherein the acquiring, by a base station, channel state information of dimension-reduced channel subspace by performing a level-one channel state measurement comprises:
    sending, by the base station, a level-one reference signal (RS) to the user equipment; and
    receiving, by the base station, the channel state information, fed back by the user equipment, of the dimension-reduced channel subspace, wherein the channel state information of the channel subspace is channel state information, obtained after the user equipment performs measurement according to the level-one RS to obtain corresponding channel subspace and performs dimension reduction and quantization on the channel subspace, of the channel subspace.

3. The method according to claim 2, wherein the level-one RS is a cell-specific RS.

4. The method according to claim 1, wherein the performing level-two channel state information measurement on the user equipment to acquire state information of a dimension-reduced real-time channel comprises:
    sending, by the base station, a user-specific level-two RS to the user equipment, wherein the user-specific level-two RS has been processed using the first-level precoding corresponding to the channel state information of the channel subspace; and
    receiving, by the base station, the state information, fed back by the user equipment, of the dimension-reduced real-time channel, wherein the state information of the dimension-reduced real-time channel is state information, obtained after the user equipment performs measurement and quantization on the dimension-reduced real-time channel according to the user-specific level-two RS, of the dimension-reduced real-time channel.

5. The method according to claim 1, wherein the processing, by the base station, downlink data and a user-specific demodulation reference signal by applying two-level precoding, and sending processed downlink data and a processed user-specific demodulation reference signal to the user equipment comprises:
    multiplying, by the base station, the downlink data by the second-level precoding corresponding to the state information of the real-time channel and then by the first-level precoding corresponding to the channel state information of the channel subspace, and sending a result of the multiplying to the user equipment; and
    multiplying, by the base station, the user-specific demodulation reference signal by the second-level precoding corresponding to the state information of the real-time channel and then by the first-level precoding corresponding to the channel state information of the channel subspace, and sending a result of the multiplying to the user equipment.

6. A multiple-antenna data transmission method, comprising:
    sending, by user equipment, channel state information of dimension-reduced channel subspace to a base station, wherein the channel state information of dimension-reduced channel subspace is obtained according to a level-one reference signal (RS) sent by the base station;
    receiving, by the user equipment, a level-two RS sent by the base station, and feeding back state information of a dimension-reduced real-time channel to the base station, wherein the state information of a dimension-reduced real-time channel is obtained according to the level-two RS;
    receiving, by the user equipment, downlink data and a user-specific demodulation reference signal that are sent by the base station, wherein the downlink data and the user-specific demodulation reference signal are data sent by the base station after being processed a two-level precoding, the two-level precoding comprising first-level precoding corresponding to the channel state information of the channel subspace and second-level precoding corresponding to the state information of the real-time channel.

7. The method according to claim 6, wherein the channel state information of the dimension-reduced channel subspace is obtained by:
performing measurement according to the level-one reference signal (RS) to obtain the channel subspace; and
obtaining channel the state information of the dimension-reduced channel subspace by performing dimension reduction and quantization on the channel subspace.

8. The method according to claim 6, wherein the level-one RS is a cell-specific reference signal.

9. The method according to claim 6, wherein the level-two RS is a user-specific level-two RS which has been processed by using the first-level precoding corresponding to the channel state information of the channel subspace.

10. A apparatus for implementing multiple-antenna data transmission, comprising:
an input apparatus,
an output apparatus, and
a processor coupled with the input apparatus and the output apparatus;
wherein the processor is configured to perform the following steps:
acquiring channel state information of dimension-reduced channel subspace by using a level-one channel state information measurement, wherein the channel subspace is a channel subspace determined by performing a dimension reduction on statistical channel subspace of user equipment; and
performing level-two channel state information measurement on the user equipment to acquire state information of a dimension-reduced real-time channel; and
processing downlink data and a user-specific demodulation reference signal by performing two-level precoding, and sending processed downlink data and a processed user-specific demodulation reference signal to the user equipment by using the output apparatus, wherein the two-level precoding comprises first-level precoding corresponding to the channel state information of the channel subspace and second-level precoding corresponding to the state information of the real-time channel.

11. The base station according to claim 10, wherein that the processor acquires channel state information of dimension-reduced channel subspace by using the level-one channel state information measurement comprises:
sending a level-one reference signal (RS) to the user equipment by using the output apparatus; and
receiving, by using the input apparatus, the channel state information, fed back by the user equipment, of the dimension-reduced channel subspace, wherein the channel state information of the channel subspace is channel state information, obtained after the user equipment performs measurement according to the level-one RS to obtain corresponding channel subspace and performs dimension reduction and quantization on the channel subspace, of the channel subspace.

12. The base station according to claim 11, wherein the level-one RS is a cell-specific RS.

13. The base station according to claim 10, wherein the processor performs level-two channel state information measurement on the user equipment to acquire state information of a dimension-reduced real-time channel comprises:
sending, by using the output apparatus, a user-specific level-two RS to the user equipment, wherein the user-specific level-two RS has been processed by using the first-level precoding corresponding to the channel state information of the channel subspace; and
receiving, by using the input apparatus, the state information, fed back by the user equipment in the set of user equipment, of the dimension-reduced real-time channel, wherein the state information of the dimension-reduced real-time channel is state information, obtained after the user equipment performs measurement and quantization on the dimension-reduced real-time channel according to the user-specific level-two RS, of the dimension-reduced real-time channel.

14. The base station according to claim 10, wherein that the processor processes downlink data and a user-specific demodulation reference signal by performing two-level precoding, and sends processed downlink data and a processed user-specific demodulation reference signal to the user equipment comprises:
multiplying the downlink data by the second-level precoding corresponding to the state information of the real-time channel and then by the first-level precoding corresponding to the channel state information of the channel subspace, and sending a result of the multiplying to the user equipment by using the output apparatus; and
multiplying the user-specific demodulation reference signal by the second-level precoding corresponding to the state information of the real-time channel and then by the first-level precoding corresponding to the channel state information of the channel subspace, and sending a result of the multiplying to the user equipment by using the output apparatus.

15. User equipment, wherein comprises an input apparatus, an output apparatus, and a processor, wherein
the processor is configured to execute the following steps:
obtain channel state information of a dimension-reduced channel subspace according to a level-one reference signal (RS) sent by a base station, and sending the channel state information of a dimension-reduced channel subspace to the base station by using the output apparatus;
performing level-two channel state information measurement according to a level-two RS sent by the base station to obtain state information of a dimension-reduced real-time channel, and sending the state information of the dimension-reduced real-time channel by using the output apparatus; and
receiving, by using the input apparatus, downlink data and a user-specific demodulation reference signal that are sent by the base station, wherein the downlink data and the user-specific demodulation reference signal are data sent by the base station after being processed by using the two-level precoding, and the two-level precoding comprises first-level precoding corresponding to the channel state information of the channel subspace and second-level precoding corresponding to the state information of the real-time channel.

16. The user equipment according to claim 15, wherein that the processor obtains channel state information of the dimension-reduced channel subspace according to the level-one reference signal (RS) sent by a base station comprises:
performing measurement according to the level-one reference signal (RS) to obtain the channel subspace; and
obtaining channel the state information of the dimension-reduced channel subspace by performing dimension reduction and quantization on the channel subspace.

17. The user equipment according to claim 15, wherein the level-one RS is a cell-specific RS.

18. The user equipment according to claim 15, wherein the level-two RS is a user-specific level-two RS which has been processed by means of a first-level precoding corresponding to the channel state information of the dimension-reduced channel subspace.

* * * * *